(12) United States Patent
Komatsu et al.

(10) Patent No.: US 11,299,239 B2
(45) Date of Patent: Apr. 12, 2022

(54) BICYCLE ELECTRICAL REAR DERAILLEUR

(71) Applicant: Shimano Inc., Osaka (JP)

(72) Inventors: Atsushi Komatsu, Osaka (JP); Shingo Sakurai, Osaka (JP); Yuta Kurokawa, Osaka (JP)

(73) Assignee: Shimano Inc., Osaka (JP)

( * ) Notice: Subject to any disclaimer, the term of this patent is extended or adjusted under 35 U.S.C. 154(b) by 50 days.

(21) Appl. No.: 16/438,191

(22) Filed: Jun. 11, 2019

(65) Prior Publication Data

US 2019/0291816 A1 Sep. 26, 2019

Related U.S. Application Data

(63) Continuation of application No. 14/928,053, filed on Oct. 30, 2015, now Pat. No. 10,370,060.

(51) Int. Cl.
| | |
|---|---|
| *B62M 9/122* | (2010.01) |
| *B62M 25/08* | (2006.01) |
| *B62K 25/28* | (2006.01) |
| *B62K 25/30* | (2006.01) |
| *B62M 9/132* | (2010.01) |
| *B62K 19/36* | (2006.01) |
| *B62J 45/20* | (2020.01) |
| *B62M 25/00* | (2006.01) |
| *B62K 25/04* | (2006.01) |

(52) U.S. Cl.
CPC ............ *B62M 9/122* (2013.01); *B62J 45/20* (2020.02); *B62K 19/36* (2013.01); *B62K 25/286* (2013.01); *B62K 25/30* (2013.01); *B62M 9/132* (2013.01); *B62M 25/08* (2013.01); *B62K 2025/048* (2013.01); *B62M 2025/006* (2013.01)

(58) Field of Classification Search
CPC .... B62M 9/122; B62M 9/132; Y10T 74/2003
USPC ....................................... 474/80, 82
See application file for complete search history.

(56) References Cited

U.S. PATENT DOCUMENTS

| | | | | |
|---|---|---|---|---|
| 4,077,485 A | * | 3/1978 | Bonora ............... | B62J 11/00 180/231 |
| 5,211,583 A | * | 5/1993 | Endo .................. | H01R 13/4368 439/491 |
| 5,213,548 A | * | 5/1993 | Colbert .............. | B62M 25/08 280/238 |
| 5,480,356 A | * | 1/1996 | Campagnolo ..... | B62M 9/122 280/238 |
| 5,577,969 A | * | 11/1996 | Watarai .............. | B62M 9/122 474/78 |
| 6,162,140 A | * | 12/2000 | Fukuda .............. | B62M 9/122 474/70 |
| 6,244,415 B1 | * | 6/2001 | Fujii .................. | B62M 25/00 192/217 |

(Continued)

FOREIGN PATENT DOCUMENTS

| | | |
|---|---|---|
| CN | 103693155 A | 4/2014 |
| EP | 1 752 373 B1 | 11/2008 |

*Primary Examiner* — Henry Y Liu
(74) *Attorney, Agent, or Firm* — Global IP Counselors, LLP

(57) ABSTRACT

A bicycle electrical rear derailleur is provided that basically includes a wireless communication unit and an electrical port. The wireless communication unit is configured to wirelessly receive a control signal. The electrical port is configured to be detachably connected to an electrical cable.

13 Claims, 14 Drawing Sheets

(56) References Cited

U.S. PATENT DOCUMENTS

| | | | | |
|---|---|---|---|---|
| 6,423,443 B1* | 7/2002 | Tsuboi | B60K 1/04 | 429/98 |
| 6,453,262 B1* | 9/2002 | Kitamura | B62M 25/00 | 324/160 |
| 6,558,180 B2* | 5/2003 | Nishimoto | H01R 9/223 | 439/271 |
| 6,600,411 B2* | 7/2003 | Nishimoto | B62M 25/08 | 340/427 |
| 6,623,389 B1* | 9/2003 | Campagnolo | B62M 9/122 | 474/70 |
| 6,648,686 B2* | 11/2003 | Nishimoto | H01R 13/112 | 439/605 |
| 6,761,655 B2* | 7/2004 | Fukuda | B62M 9/122 | 474/102 |
| 6,843,741 B2* | 1/2005 | Fujii | B62M 9/04 | 280/238 |
| 6,979,009 B2* | 12/2005 | Ichida | B62M 9/132 | 280/238 |
| 7,306,531 B2* | 12/2007 | Ichida | B62M 9/122 | 474/70 |
| 7,341,532 B2* | 3/2008 | Ichida | B62M 9/132 | 474/70 |
| 7,373,232 B2* | 5/2008 | Guderzo | B62M 9/122 | 474/116 |
| 7,442,136 B2* | 10/2008 | Ichida | B62M 9/132 | 474/80 |
| 7,553,247 B2* | 6/2009 | Guderzo | B62M 25/08 | 474/70 |
| 7,704,173 B2* | 4/2010 | Ichida | B62M 9/132 | 474/82 |
| 7,762,916 B2* | 7/2010 | Ichida | B62M 9/132 | 474/82 |
| 7,980,974 B2* | 7/2011 | Fukuda | B62M 25/08 | 474/70 |
| 8,025,597 B2* | 9/2011 | Takamoto | B62M 9/122 | 474/70 |
| 8,137,223 B2* | 3/2012 | Watarai | B62M 9/126 | 474/110 |
| 8,241,158 B2* | 8/2012 | Ishikawa | B62M 25/08 | 474/80 |
| 8,282,519 B2* | 10/2012 | Ichida | B62M 9/132 | 474/82 |
| 8,721,495 B2* | 5/2014 | Kitamura | B62M 9/122 | 477/7 |
| 8,864,611 B2* | 10/2014 | Kuwayama | B62M 9/1344 | 474/80 |
| 8,882,122 B2* | 11/2014 | Emura | B62M 25/08 | 280/200 |
| 8,888,620 B2* | 11/2014 | Emura | B62M 9/135 | 474/80 |
| 8,979,683 B2* | 3/2015 | Katsura | B62M 9/122 | 474/80 |
| 9,037,368 B2* | 5/2015 | Miglioranza | F16H 61/0213 | 701/60 |
| 9,151,379 B2* | 10/2015 | Kuroda | B62K 23/06 | |
| 9,381,974 B2* | 7/2016 | Katsura | B62M 9/132 | |
| 9,573,652 B2* | 2/2017 | Kuwayama | B62M 9/132 | |
| 9,676,444 B2* | 6/2017 | Shipman | B62M 9/122 | |
| 9,676,446 B2* | 6/2017 | Pasqua | B62M 9/134 | |
| 9,873,482 B2* | 1/2018 | Nishino | B62M 9/135 | |
| 2002/0190173 A1* | 12/2002 | Fujii | B62M 9/122 | 248/300 |
| 2005/0170889 A1* | 8/2005 | Lum | A63F 13/235 | 463/39 |
| 2005/0187051 A1* | 8/2005 | Fujii | B62M 25/045 | 474/80 |
| 2006/0186631 A1* | 8/2006 | Ishikawa | B62M 25/08 | 280/260 |
| 2007/0037645 A1* | 2/2007 | Ishikawa | B62M 9/132 | 474/80 |
| 2008/0312799 A1* | 12/2008 | Miglioranza | B62M 9/122 | 701/66 |
| 2011/0320093 A1* | 12/2011 | Kitamura | B62M 25/08 | 701/51 |
| 2012/0221205 A1* | 8/2012 | Ichida | B62K 23/02 | 701/37 |
| 2012/0322591 A1* | 12/2012 | Kitamura | B62J 6/06 | 474/80 |
| 2013/0061705 A1* | 3/2013 | Jordan | B62K 23/06 | 74/473.13 |
| 2013/0151073 A1* | 6/2013 | Tetsuka | B62K 21/26 | 701/37 |
| 2013/0192405 A1* | 8/2013 | Katsura | B62M 9/132 | 74/473.12 |
| 2013/0194384 A1* | 8/2013 | Hannuksela | H04N 19/513 | 348/43 |
| 2014/0058578 A1* | 2/2014 | Tetsuka | B62M 25/08 | 701/1 |
| 2014/0070930 A1* | 3/2014 | Hara | B62J 6/00 | 340/432 |
| 2014/0087901 A1* | 3/2014 | Shipman | B62M 9/132 | 474/82 |
| 2014/0114538 A1* | 4/2014 | Shipman | F16H 9/06 | 701/51 |
| 2014/0214285 A1* | 7/2014 | Wesling | F16H 59/02 | 701/51 |
| 2014/0290411 A1* | 10/2014 | Kuroda | B62M 9/122 | 74/473.12 |
| 2014/0290412 A1* | 10/2014 | Emura | B62M 25/08 | 74/473.12 |
| 2014/0371953 A1* | 12/2014 | Miller | B62M 25/08 | 701/2 |
| 2015/0073656 A1* | 3/2015 | Takamoto | G06F 9/02 | 701/37 |
| 2015/0329161 A1* | 11/2015 | Fujii | B62M 25/08 | 701/64 |
| 2016/0311499 A1* | 10/2016 | Kasai | B62M 25/08 | |

\* cited by examiner

BICYCLE ELECTRICAL REAR DERAILLEUR

CROSS-REFERENCE TO RELATED APPLICATIONS

This application is a continuation application of U.S. patent application Ser. No. 14/928,053, filed on Oct. 30, 2015. The entire disclosure of U.S. patent application Ser. No. 14/928,053 is hereby incorporated herein by reference.

BACKGROUND

Field of the Invention

This invention generally relates to a bicycle electrical rear derailleur. More specifically, the present invention relates to a bicycle electrical rear derailleur having a power supply unit and a power supply bracket.

Background Information

In recent years, some bicycles are provided with electrical components or devices to make it easier for the rider to operate the bicycle. Examples of such bicycle electrical components include suspensions, transmission devices (e.g., derailleurs, internally geared hubs, etc.) and seatposts. Such bicycle electrical components require electricity from a power source, such as a wheel hub generator and/or a battery. Typically, the power source is mounted remotely from the electrical components. As a result, electrical cables are routed along the bicycle frame between the electrical components and the battery. Also these bicycle electrical components can be interconnected to communicate with electrical cables or through wireless communications. Wireless bicycle electrical components are advantageous in that electrical cables connecting bicycle electrical components to each other can be omitted.

SUMMARY

Generally, the present disclosure is directed to various features of a bicycle electrical rear derailleur having a power supply unit and a power supply bracket.

As explained below, by using bicycle electrical components of the present invention, a user is provided with the flexibility to choose either wireless or wired communications for each of the bicycle electrical components by selecting to attach or detach a power supply bracket and a power supply unit to the bicycle electrical component.

In view of the state of the known technology and in accordance with a first aspect of the present disclosure, a bicycle electrical rear derailleur is provided that basically comprises a wireless communication unit and an electrical port. The wireless communication unit is configured to wirelessly receive a control signal. The electrical port is configured to be detachably connected to an electrical cable.

In accordance with a second aspect of the present invention, the bicycle electrical rear derailleur according to the first aspect is configured so that the electrical port is an electrical female electrical receptor.

In accordance with a third aspect of the present invention, the bicycle electrical rear derailleur according to the first or second aspect is configured so that the wireless communication unit is configured to receive electrical power from a power supply unit via the electrical cable.

In accordance with a fourth aspect of the present invention, the bicycle electrical rear derailleur according to any one of the first to third aspects is configured so that the wireless communication unit includes a first housing.

In accordance with a fifth aspect of the present invention, the bicycle electrical rear derailleur according to any one of the first to fourth aspects is configured so that the wireless communication unit includes a wireless communicator that is configured to receive shift signals and to transmit at least one of position data and operational data.

In accordance with a sixth aspect of the present invention, the bicycle electrical rear derailleur according to any one of the first to fifth aspects further comprises a structure configured to detachably attach the wireless communications unit.

In accordance with a seventh aspect of the present invention, the bicycle electrical rear derailleur according to any one of the first to sixth aspects further comprises a movable member; and an electrical actuation unit configured to actuate the movable member.

In accordance with an eighth aspect of the present invention, the bicycle electrical rear derailleur according to the seventh aspect is configured so that the electrical actuation unit is configured to receive electrical power from a power supply unit via the electrical cable.

In accordance with a ninth aspect of the present invention, the bicycle electrical rear derailleur according to the seventh or eighth aspect is configured so that the electrical actuation unit is configured to receive a control signal from the electrical cable or the wireless communication unit.

In accordance with a tenth aspect of the present invention, the bicycle electrical rear derailleur according to any one of the seventh to ninth aspects is configured so that the electrical actuation unit includes the electrical port.

In accordance with an eleventh aspect of the present invention, the bicycle electrical rear derailleur according to any one of the seventh to tenth aspects further comprises a base member configured to support the electrical actuation unit with respect to the bicycle frame.

In accordance with a twelfth aspect of the present invention, the bicycle electrical rear derailleur according to the eleventh aspect is configured so that the movable member includes a chain guide and the base member that supports the chain guide with respect to the bicycle frame.

Also other objects, features, aspects and advantages of the disclosed bicycle electrical rear derailleur will become apparent to those skilled in the art from the following detailed description, which, taken in conjunction with the annexed drawings, discloses illustrative embodiments of the bicycle electrical rear derailleur.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
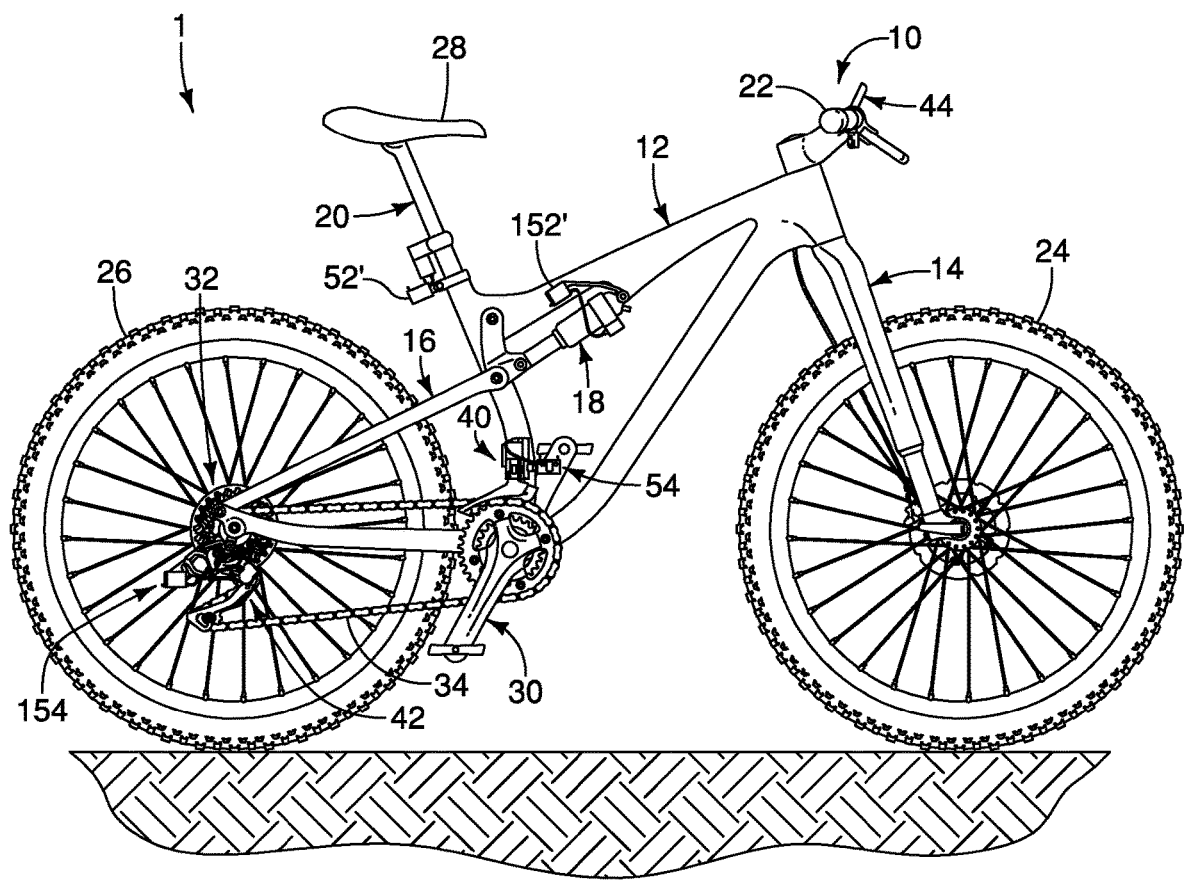
FIG. 1 is a side elevational view of a bicycle that is equipped with a plurality of bicycle electrical components (i.e. a front derailleur, a rear derailleur, a front suspension, a rear suspension and an adjustable seatpost) that each individually includes a power supply unit supported by a power supply bracket and a wireless communications unit supported by the power supply unit to form a plurality of bicycle electrical component assemblies in accordance with a first embodiment.

Referring initially to FIG. 1, a bicycle 1 is illustrated that is equipped with a wireless communication system 10 in accordance with a first embodiment. In FIG. 1, the bicycle 1 is a dual suspension (off road) bicycle. However, the wireless communication system 10 discussed herein is not limited to the illustrated bicycle, but rather can be adapted to other types of bicycles such as a road bicycle with a drop handlebar.

The bicycle 1 includes a main bicycle frame 12, a front suspension fork 14 (i.e., a bicycle front suspension), a rear swing arm or sub bicycle frame 16, a rear shock 18 (i.e., a bicycle rear suspension) and an adjustable seatpost 20. A handlebar 22 is fixed to the top of the front suspension fork 14 in order to steer the bicycle 1. The lower end of the front suspension fork 14 rotatably supports a front wheel 24. The rear swing arm 16 is pivotally mounted to the main bicycle frame 12, and rotatably supports a rear wheel 26. A bicycle seat or saddle 28 is mounted to the adjustable seatpost 20, which is adjustably mounted to the main bicycle frame 12. The bicycle 1 further includes a drive train having a front pedal crankset 30, a rear sprocket cassette 32 and a chain 34. The bicycle 1 further includes a font derailleur 40 and a rear derailleur 42 for changing speeds of the drive train. The front derailleur 40 is mounted on the main bicycle frame 12, while the rear derailleur 42 is mounted on the rear swing arm 16.

In the illustrated embodiment, the front suspension fork 14, the rear shock 18, the adjustable seatpost 20, the front derailleur 40 and the rear derailleur 42 are examples of bicycle electrical components that are adjustable between at least two operation modes. Thus, in certain instances herein, the front suspension fork 14, the rear shock 18, the adjustable seatpost 20, the front derailleur 40 and the rear derailleur 42 will be collectively referred to as bicycle electrical components. As explained below, the bicycle electrical components 14, 18, 20, 40 and 42 are configured to be applied for both wireless communications and for wired communications.

In FIG. 1, the bicycle electrical components 14, 18, 20, 40 and 42 are set up for wireless communications. Since bicycle electrical components such as the bicycle electrical components 14, 18, 20, 40 and 42 illustrated herein are well known in the bicycle field, the bicycle electrical components 14, 18, 20, 40 and 42 will only be discussed to the extent needed to understand the modifications made to carry out the present invention. Also, the bicycle electrical components 14, 18, 20, 40 and 42 are not limited to the electric bicycle components and the particular arrangements disclosed herein. Rather, the wireless communication system 10 can have any combination of the bicycle electrical components 14, 18, 20, 40 and 42 as well as other bicycle electrical components (not shown) as needed and/or desired.

Figure 2:
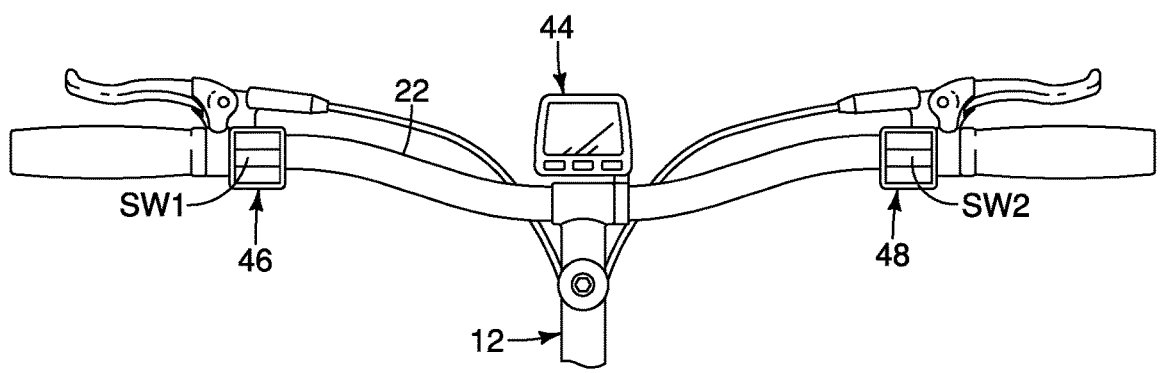
FIG. 2 is a top view of a bicycle handlebar area of the bicycle illustrated in FIG. 1.

As seen in FIG. 2, the handlebar 22 is provided with a cycle computer 44, a first electrical component operating device 46 and a second electrical component operating device 48. The cycle computer 44, the first electrical component operating device 46 and the second electrical component operating device 48 form a control part of the wireless communication system 10 that controls the operations of the front suspension fork 14, the rear shock 18, the adjustable seatpost 20, the front derailleur 40 and the rear derailleur 42. The bicycle 10 further includes numerous other components that are typically installed on a bicycle, but that are not related to the wireless communication system 10 discussed herein.

As seen in FIG. 2, the first electrical component operating device 46 includes a first manually operated input member SW1, while the second electrical component operating device 48 includes a second manually operated input member SW2. The first and second manually operated input members SW1 and SW2 can be used to control one or two of the bicycle electrical components 14, 18, 20, 40 and 42. At least one of the input members SW1 and SW2 can include a wireless transmitter to transmit and/or receive a wireless signal, such as a shifting signal, to the wireless communications unit as the present invention. Thus, the wireless communications unit of the input members SW1 and SW2 can be a two-way wireless communications unit that conducts two-way wireless communications using a wireless receiver and a wireless transmitter.

Here, the cycle computer 44 also can include a wireless communications unit (not shown) for wirelessly transmitting and/or receiving signals and data to the bicycle electrical components 14, 18, 20, 40 and 42 based on operation signals from the first and second electrical component operating devices 46 and 48. Thus, the wireless communications unit of the cycle computer 44 is a two-way wireless communications unit that conducts two-way wireless communications using a wireless receiver and a wireless transmitter. In the illustrated embodiment, the wireless communications units of the input members SW1 and SW2 and the cycle computer 44 include its own power source (e.g., a battery). In the present embodiment, the wireless communications unit of the cycle computer 44 can be used for wireless communications with other devices, such as a smart-phone or a personal computer, for updating firmware stored in memory disposed in one or more of the bicycle electrical components 14, 18, 20, 40 and 42, for example. However, the cycle computer 44 can be omitted from the bicycle 1, if needed and/or desired.

The wireless control signals of the wireless communications unit of the input members SW1 and SW2 can be radio frequency (RF) signals or any other type of signal suitable for wireless communications as used in the bicycle field. It should also be understood that the wireless communications unit of the input members SW1 and SW2 can transmit the signals at a particular frequency and/or with an identifier such as a particular code, to distinguish the wireless control signal from other wireless control signals. In this way, the bicycle electrical components 14, 18, 20, 40 and 42 can recognize which control signals are to be acted upon and which control signals are not to be acted upon. For example, the front derailleur 40 and the rear derailleur 42 can recognize which control signals are upshifting signals, and which control signals are downshifting signals. Thus, the front derailleur 40 can ignore the control signals for the rear derailleur 42 and vice versa.

Alternatively, the wireless communication unit of the input member SW1 can be wirelessly paired with the front derailleur 40 to establish wireless communication between them. Also, the wireless communication unit of the input member SW2 can be wirelessly paired with the rear derailleur 42 to establish wireless communication between them. By this way, the front derailleur 40 can be controlled only by the wireless control signal from the wireless communication unit of the input member SW1 and the rear derailleur 42 can be controlled only by the wireless control signal from the wireless communication unit of the input member SW2. Alternatively, both wireless communication units of the input members SW1 and SW2 can be wirelessly paired with one of the front derailleur 40 and the rear derailleur 42. In such the case, the rear derailleur 42 can be wirelessly paired with the front derailleur 40. By this way, for example, the rear derailleur 42 can be operated by a wireless signal from the wireless communication unit of the input member SW1 for upshifting and operated by a wireless signal from the wireless communication unit of the input member SW2 for downshifting. Further, if the rear derailleur 42 receives wireless signals from both wireless communication units of the input members SW1 and SW2 at the same time, the rear derailleur 42 does not move and can transmit a wireless signal to the front derailleur 40 to operate the front derailleur 40.

The cycle computer 44 is programmed to selectively output wireless control signals to selectively control the bicycle electrical components 14, 18, 20, 40 and 42. More specifically, the cycle computer 44 includes a suspension adjustment program, a seatpost adjustment program and a shifting program stored in memory. The cycle computer 44 is configured so that the user can select a suspension adjustment mode, a seatpost adjustment mode and a shifting mode. In the suspension adjustment mode, the operation signals outputted from the first and second electrical component operating devices 46 and 48 are used by the cycle computer 44 to selectively control one or both of the front suspension fork 14 and the rear shock 18 based on the suspension adjustment program stored in the memory of the cycle computer 44. In the seatpost adjustment mode, the operation signals outputted from the first and second electrical component operating devices 46 and 48 are used by the cycle computer 44 to selectively control the adjustable seatpost 20 based on the seatpost adjustment program stored in the memory of the cycle computer 44. In the shifting mode, the operation signals outputted from the first and second electrical component operating devices 46 and 48 are used by the cycle computer 44 to selectively control one or both of the front derailleur 40 and the rear derailleur 42 based on the shifting program stored in the memory of the cycle computer 44.

In the illustrated bicycle 1, each of the bicycle electrical components 14, 18, 20, 40 and 42 is provided with its own individual power source, which minimizes the need to route electrical cables along the bicycle frame 12. However, preferably as explained below, each of the bicycle electrical components 14, 18, 20, 40 and 42 is configured such that a user can choose either wireless or wired communications for each of the bicycle electrical components by selecting to attach or detach a power supply bracket and a power supply unit to the bicycle electrical component. If the user chooses the wired communications by selecting to detach the power supply bracket and the power supply unit from the bicycle electrical component, at least one power supply can be shared by more than two of the bicycle electrical components 14, 18, 20, 40 and 42. Thus, it can be possible to reduce the number of the power supply.

For the sake of brevity, the following description will focus primarily on the power sources that are provided to the front derailleur 40 and the rear derailleur 42. Of course, it will be apparent from this disclosure that the bicycle electrical components 14, 18 and 20 are equipped with similar power sources that have a similar construction, but which have been modified for the particular constructions of the particular components. Alternatively, at least two of the bicycle electrical components 14, 18, 20, 40 and 42 can share the power source via an electrical cable PLC as described below.

Turning now to FIGS. 3 to 8, the front derailleur 40 will now be discussed in more detail. Here, the front derailleur 40 is provided with a power supply unit 50 and a power supply bracket 52 to form a bicycle electrical component assembly 54. Thus, the bicycle electrical component assembly 54 comprises the bicycle electrical component (i.e., the front derailleur 40), the power supply unit 50 and the power supply bracket 52. The power supply unit 50 includes a built-in PLC unit that transmits and/or receives data. The bicycle electrical component (i.e., the front derailleur 40) further comprises a wireless communicator 56 that is supported on the power supply unit 50. The wireless communicator 56 is configured to wirelessly receive shift signals and transmit position data and/or operational data from the cycle computer 44 and/or the first and second electrical component operating devices 46 and 48, or one of the other bicycle electric components (e.g., the rear derailleur 42). While the wireless communicator 56 is illustrated as being contained within the power supply unit 50, it will be apparent from this disclosure that the wireless communicator 56 can be contained within any one of a power supply unit, a power supply bracket and an electrical actuation unit of the front derailleur 40.

Figure 4:
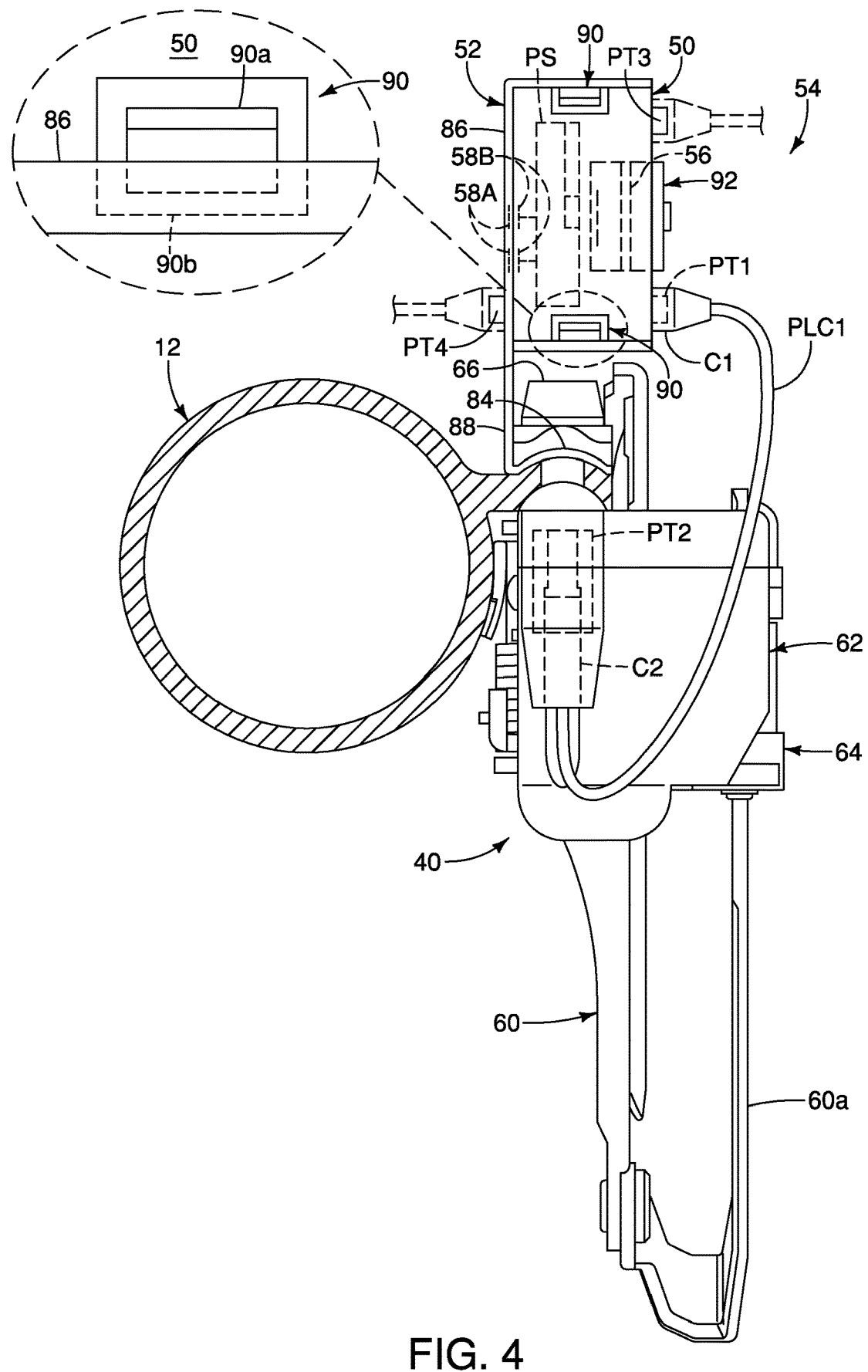
FIG. 4 is an enlarged, top view of the front derailleur illustrated in FIGS. 1 and 3 with the chain guide in the retracted position and with the seat tube of the bicycle frame shown in cross section.
Figure 8:
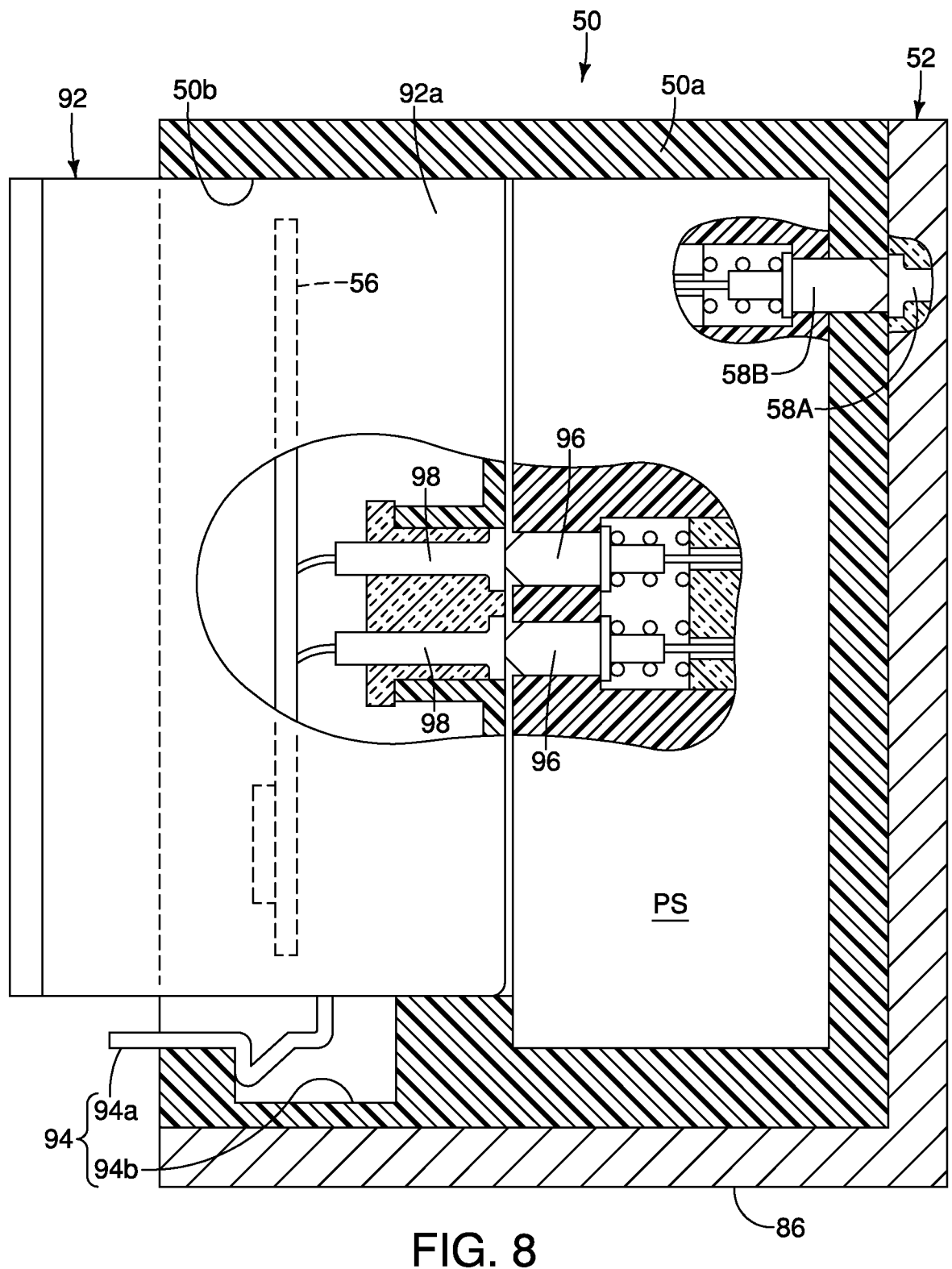
FIG. 8 is a cross sectional view of the power supply bracket and the power supply unit, as seen along section line 8-8 of FIG. 3, to show a wireless communications unit detachably and reattachably supported to the power supply unit, and with portions of the battery of the power supply unit and the housing of the wireless communications unit broken away to show the electrical connection therebetween while the wireless communications unit is installed in the power supply unit.

As explained below, the power supply unit 50 is detachably and reattachably supported to the power supply bracket 52. Preferably, the power supply unit 50 forms an electrical connection with the power supply bracket 52 while the power supply unit 50 is installed in the power supply bracket 52. In particular, as best seen in FIGS. 4 and 8, the power supply bracket 52 includes a first interface 58A, and the power supply unit 50 includes a second interface 58B that is configured to electrically connect with the first interface 58A in a state where the power supply unit 50 is supported to the power supply bracket 52. In this way, the power supply bracket 52 can be used for conducting power line communications. Here, the first interface 58A is formed by a pair of stationary electrical contacts (only one shown in FIG. 8), while the second interface 58B is formed by a pair of spring loaded electrical contacts (only one shown in FIG. 8). However, the first and second interfaces 58A and 58B can be any suitable electrical interfaces that electrically transmit electrical power therebetween. For example, the first and second interfaces 58A and 58B can be contactless electrical connectors in which the metal electrical contacts of the mating electrical connectors do not create physically electrical connection for both contactless power and contactless data (contactless connectivity). Of course, other types of physically electrical connections using contacts and/or terminals can be used for the first and second interfaces 58A and 58B.

The bicycle electrical component (i.e., the front derailleur 40) further comprises a movable member 60 and an electrical actuation unit 62. The bicycle electrical component (i.e., the front derailleur 40) further comprises a base member 64 for supporting the electrical actuation unit 62. The electrical actuation unit 62 is electrically connected to the power supply unit 50 by an electrical cable PLC1 for receiving electrical power. The electrical actuation unit 62 also communicates with the wireless communicator 56 by utilizing power line communications through the electrical cable PLC1. In other words, signals or commands from the wireless communicator 56 can be transmitted through the electrical cable PLC1 to the electrical actuation unit 62 and vice versa.

In the case of the front derailleur 40, as seen in FIG. 8, the power supply unit 50 includes a housing 50a that houses a power source PS. The power source PS can be any suitable electrical power source such as a rechargeable electrical battery, a disposable electrical battery, a fuel cell battery, etc. The power supply unit 50 has a first electrical port PT1 and the electrical actuation unit 62 has a second electrical port PT2. The electrical cable PLC1 interconnects the power supply unit 50 and the electrical actuation unit 62. In particular, the electrical cable PLC1 has a first connector C1 that plugs into the first electrical port PT1 and a second connector C2 that plugs into the second electrical port PT2. The term "electrical port" as used herein means an electrical connector that joins electric conductors mechanically and electrically to other conductors or terminals of a device or an electrical cable. In other words, term "electrical port" does not include merely terminals or electrical contacts by themselves. The electrical cable PLC is a power line communications cable for transferring electrical power and transmitting control signals.

While the electrical cable PLC1 is preferably pluggable into both the power supply unit 50 and the electrical actuation unit 62. It will be apparent from this disclosure that the electrical cable PLC1 can be electrically connected in a non-releasable manner to either the power supply unit 50 or the electrical actuation unit 62. Alternatively, the electrical cable PLC1 can be electrically connected in a non-releasable manner to both the power supply unit 50 and the electrical actuation unit 62.

As seen in FIG. 4, the power supply unit 50 is also preferably provided with an additional electrical port PT3 that can be optionally connected to a remote electrical component and/or a remote power source. For example, the additional electrical port PT3 can be connected to an electrical port (not shown) of one of the first and second electrical component operating devices 46 and 48 and the cycle computer 44 and/or the rear derailleur 42 by an additional electrical cable (shown in broken lines) so that shift signals are sent via power line communications from the remote electrical component and/or the remote power source to the electrical actuation unit 62.

Likewise, as seen in FIG. 4, the power supply bracket 52 is also preferably provided with an additional electrical port PT4 that can be optionally connected to a remote electrical component and/or a remote power source. For example, the additional electrical port PT4 can be connected to an electrical port (not shown) of one of the first and second electrical component operating devices 46 and 48 and the cycle computer 44 and/or the rear derailleur 42 by an additional electrical cable (shown in broken lines) so that shift signals are sent via power line communications from the remote electrical component and/or the remote power source to the electrical actuation unit 62. In any case, preferably, at least one of the power supply unit 50 and the power supply bracket 52 includes at least one of an electrical cable and an electrical port configured to be connected to an electrical cable. Also preferably, the electrical actuation unit 62 includes at least one of an additional electrical cable and an additional electrical port configured to be connected to an electrical cable. In this way, the front derailleur 40 can be selectively configured to receive shift signals either wirelessly or via electrical cables.

Figure 5:
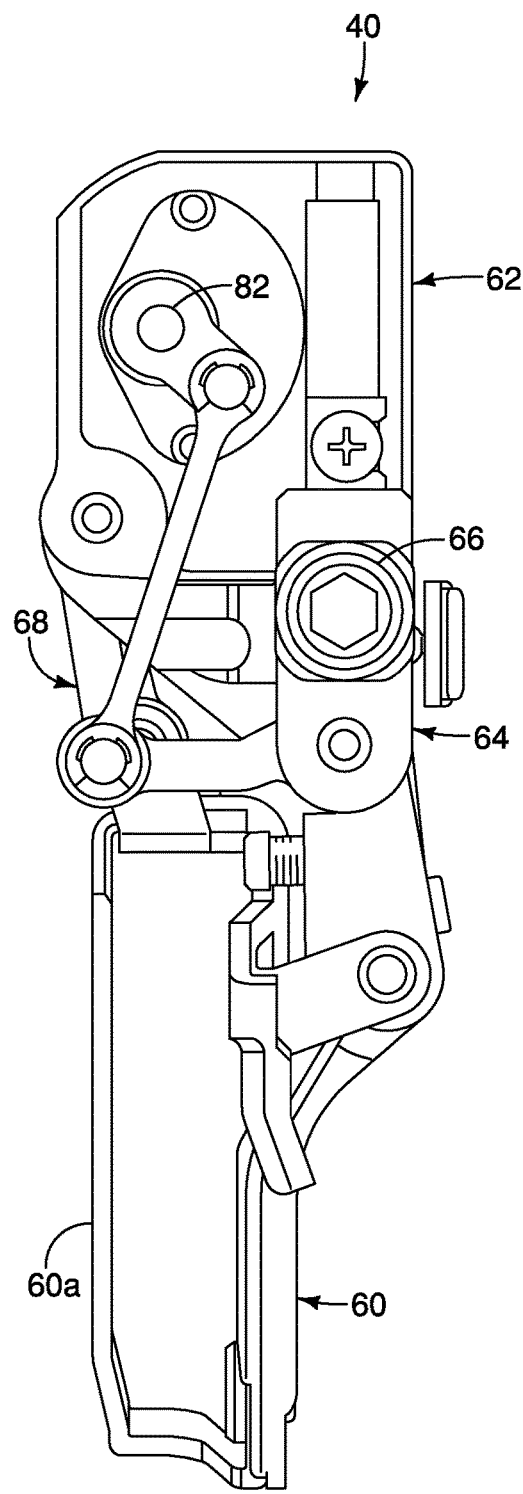
FIG. 5 is an enlarged, front end elevational view of the front derailleur illustrated in FIGS. 1, 3 and 4 with the chain guide in the retracted position and with the seat tube of the bicycle frame shown in cross section.
Figure 6:
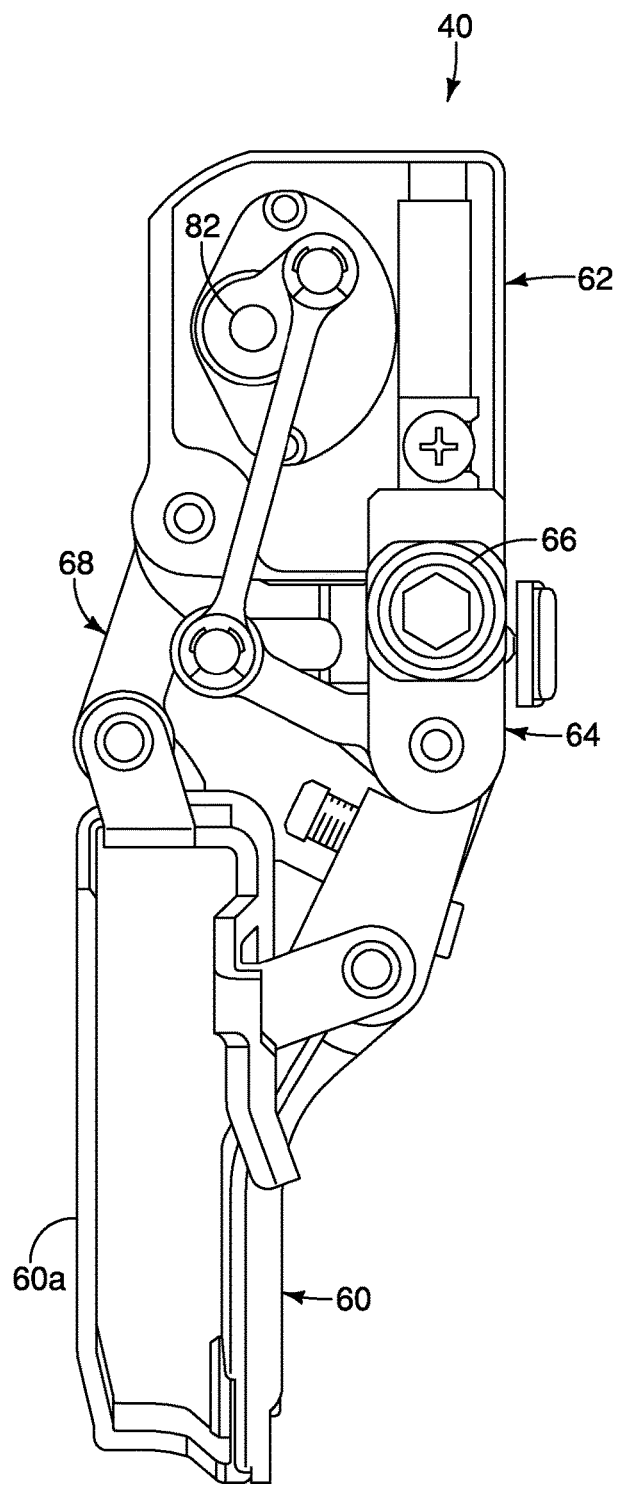
FIG. 6 is an enlarged, front end elevational view of the front derailleur illustrated in FIGS. 1, 3 to 5 with the chain guide in the retracted position and with the seat tube of the bicycle frame shown in cross section.

Since the bicycle electrical component is a front derailleur in the bicycle electrical component assembly 54, the movable member 60 includes a chain guide 60a that is movably arranged with respect to the base member 64 to guide the bicycle chain 34. The bicycle electrical component (i.e., the front derailleur 40) further comprises a fastener 66 that is configured to fix the base member 64 to a bicycle frame 12. Here, the fastener 66 is a fixing bolt. As seen in FIGS. 5 and 6, the chain guide 60a is operatively coupled to the electrical actuation unit 62 to move the chain guide 60a between a first (retracted) position and a second (extended) position by a linkage 68. Also, the chain guide 60a is pivotally supported on the base member 64 via the linkage 68.

Figure 7:
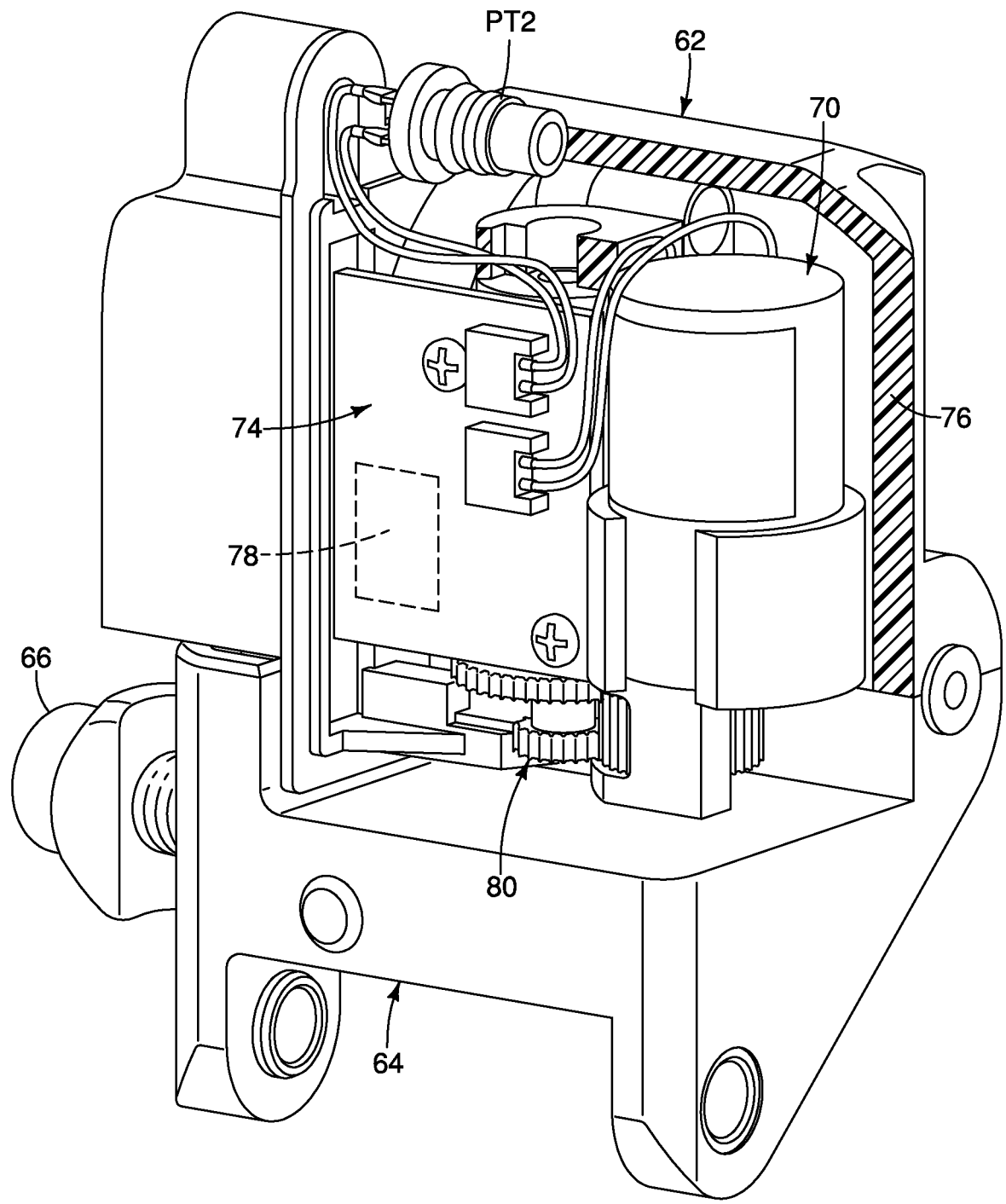
FIG. 7 is an inside rear perspective view of the front derailleur illustrated in FIGS. 1, 3 to 6 with a portion of a housing of an electrical actuation unit of the front derailleur broken away to show internal parts of the electrical actuation unit.

As seen in FIG. 7, the electrical actuation unit 62 includes an electrical actuator 70 that is operatively coupled to the movable member 60 to actuate the movable member 60. Thus, the electrical actuator 70 is configured to actuate (i.e., move) the chain guide 60a of the movable member 60 to move the chain 34 between the front sprockets. In the front derailleur 40, the electrical actuator 70 is a reversible electric motor so that the chain guide 60a of the movable member 60 can be move back and forth in a lateral direction with respect to the bicycle frame 12. The electrical actuator 70 is disposed in a housing 76 of the electrical actuation unit 62. The housing 76 is mounted on the base member 64.

The electrical actuation unit 62 further includes a printed circuit board 74 that is disposed in the housing 76 and that is electrically connected to the electrical actuator 70. The electrical actuation unit 62 also has an electrical port PT2 that electrically connected to the printed circuit board 74. The first electrical port PT2 is configured for detachably and reattachably connecting to the electrical connector of an electrical cable PLC thereto. The electrical port PT2 includes, for example, a cylindrical connector to receive or to be plugged into a connector of the electrical cable PLC. Alternatively, the electrical port PT2 includes a bore to receive the connector of the electrical cable PLC. The power supply unit 50 is electrically connected to the electrical actuation unit 62 to supply an electrical power to the electrical actuation unit 62. The electrical actuation unit 62 further includes a controller 78 that is disposed on a printed circuit board 74. The controller 78 includes a central processing unit (CPU). Preferably, the electrical actuation unit 62 further includes one or more storage devices such as a ROM (Read Only Memory) device, a RAM (Random Access Memory) device and/or a FLASH memory device. The controller 78 is programmed to access the storage device(s) that can be located on the printed circuit board 74.

Still referring to FIG. 7, the electrical actuation unit 62 further includes a gear reduction unit 80 that is connected to an output shaft of the electrical actuator 70 for transmitting the rotational movement of the output shaft of the electrical actuator 70 to a pivotal movement of the chain guide 60a via the linkage 68. As seen in FIGS. 5 and 6, the gear reduction unit 80 has an output shaft 82 that is connected to the linkage 68A for moving the linkage 68, and thus, moving chain guide 60a. A position sensor (not shown) is provided to the gear reduction unit 80 for detecting an amount of rotational movement being outputted by the gear reduction unit 80. The printed circuit board 74 is provided with an actuator (motor) driver (not shown) for controlling the electrical actuator 70 and a position detection circuit (not shown) for determining the amount of rotational movement is being outputted by the gear reduction unit 80. Position sensors, actuator (motor) drivers and position detection circuits are well known in the bicycle field, and thus, they will not be discussed herein.

Figure 3:
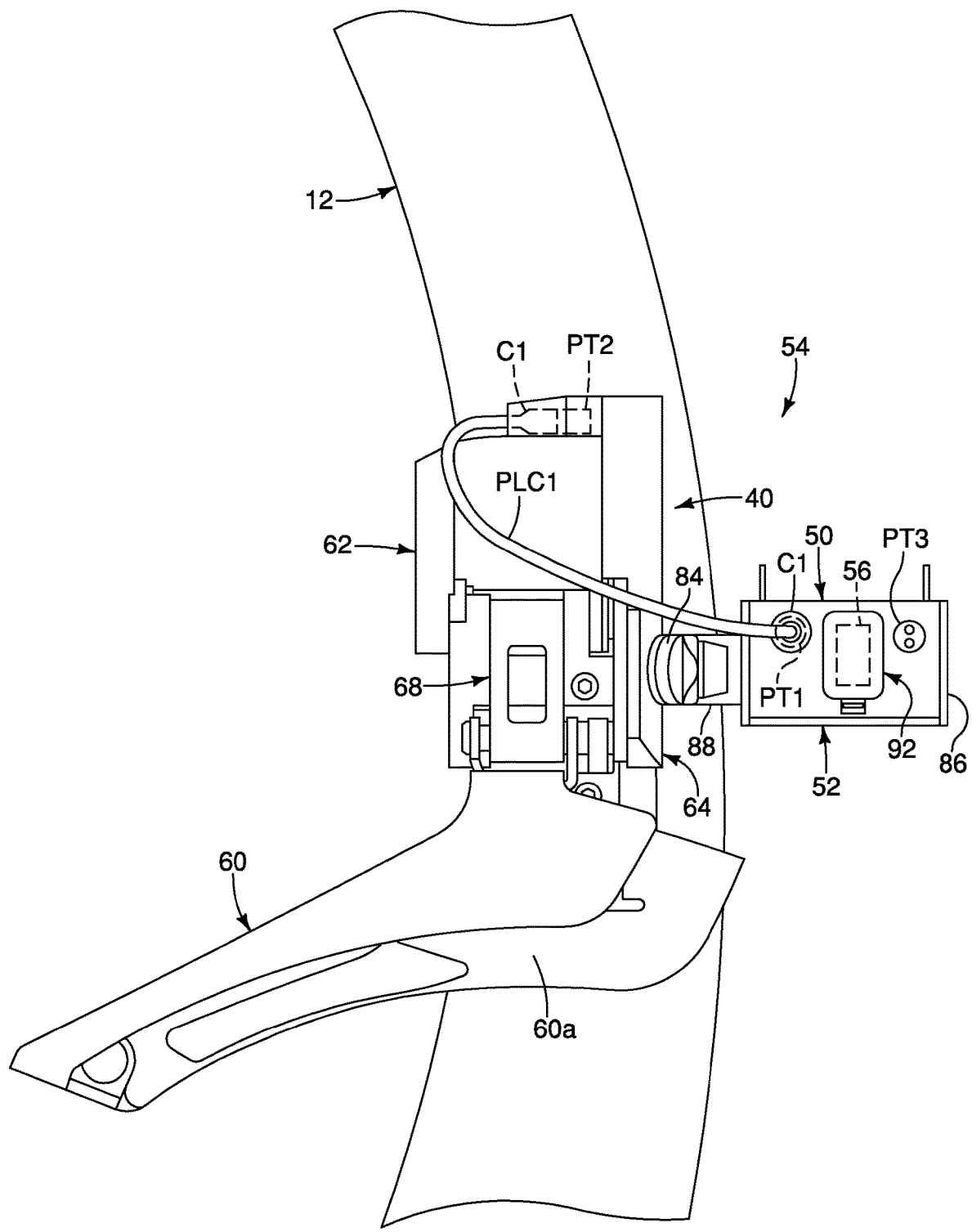
FIG. 3 is an enlarged, outside elevational view of the front derailleur (i.e., one of bicycle electrical components) illustrated in FIG. 1 having a power supply unit mounted to the front derailleur via a power supply bracket and with the front derailleur having a chain guide in a retracted position.

Referring to FIGS. 3, 4 and 8, the power supply bracket 52 will now be discussed in more detail. The power supply bracket 52 is configured to mount the power supply unit 50 to the bicycle electrical component (i.e., the front derailleur 40). Here, the power supply bracket 52 is mounted to both the bicycle frame 12 and the front derailleur 40 by the fastener 66. Specifically, the power supply bracket 52 includes a mounting portion 84 that is configured to be mounted to the bicycle frame 12 by the fastener 66. The power supply bracket 52 is also configured to be detachably and reattachably attached to an additional bicycle electrical component that is different from the bicycle electrical component. Specifically, the power supply bracket 52 is also configured to be detachably and reattachably attached to the seatpost 20 by the same fastener and/or another fastener that is used to secure the seatpost 20 to the bicycle frame 12. Thus, as seen in FIG. 1, a power supply bracket 52' is attached to the seatpost 20 by the same fastener and/or another fastener that is used to secure the seatpost 20 to the bicycle frame 12. The power supply bracket 52' is identical to the power supply bracket 52. Thus, the power supply bracket 52' contains a power supply unit (not shown) that is identical to the power supply unit 50 for supplying electrical power to the seatpost 20.

The power supply bracket 52 further includes a battery receiving part 86 and the arm part 88. The arm part 88 extends between the battery receiving part 86 and the mounting portion 84. In the case of the illustrated embodiment of FIG. 4, the power supply unit 50 is detachably and reattachably attached to the power supply bracket 52 via a pair of snap-fit structures 90. Here, as seen in FIG. 4, each of the snap-fit structures 90 includes a resilient latch 90a that is disposed on the power supply unit 50 and a recess 90b that is formed in the power supply bracket 52. Alternatively, the power supply unit 50 and the power supply bracket 52 can be configured to be detachably and reattachably attached to each other via a single snap-fit structure as needed and/or desired. Further, the power supply unit 50 can be configured to be detachably and reattachably attached to the power supply bracket 52 via a faster, such as a screw.

Referring to FIGS. 4 and 8, in the case of the front derailleur 40, the wireless communicator 56 is contained within a recess 50b of the housing 50a of the power supply unit 50. Alternatively, the wireless communicator 56 can be contained within any one of the power supply unit 50, the power supply bracket 52 and the electrical actuation unit 62. Here, in the case of the font derailleur 40, the bicycle electrical component assembly 54 further comprises a wireless communications unit 92 that includes a housing 92a. The wireless communicator 56 is contained within the housing 92a. Preferably, as illustrated, the housing 92a of the wireless communications unit 92 is detachably and reattachably supported to the power supply unit 50 via a snap-fit structure 94. Here, the snap-fit structure 94 includes a resilient latch 94a that is disposed on the housing 92a of the wireless communications unit 92 and a recess 90b that is formed in housing 50a of the power supply unit 50. In this embodiment, the housing 92a is separate member from the housing 50a. Alternatively, the housing 50a can contain the power source PS together with the wireless communicator 56. Further, the wireless communicator can be configured to be detachably or undetachably contained within power supply bracket 152 or electrical actuation unit 62.

Also the wireless communications unit 92 is configured to be electrically connected to the power supply unit 50. As illustrated in FIG. 8, the power supply unit 50 and the wireless communications unit 92 have mating electrical interfaces for transmitting electrical power from the power source PS of the power supply unit 50 to the wireless communications unit 92. In the illustrated electrical interfaces, the power source PS of the power supply unit 50 is provided with a pair of spring loaded electrical contacts 96 and the wireless communications unit 92 is provided with a pair of stationary electrical contacts 98. However, the interfaces can be any suitable electrical interfaces that electrically transmit electrical power therebetween. For example, the interfaces can be contactless electrical connectors in which the metal electrical contacts of the mating electrical connectors do not create physically electrical connection for both contactless power and contactless data (contactless connectivity). Of course, other types of physically electrical connections using contacts and/or terminals can be used for the interfaces between the power supply unit 50 and the wireless communications unit 92.

Figure 9:
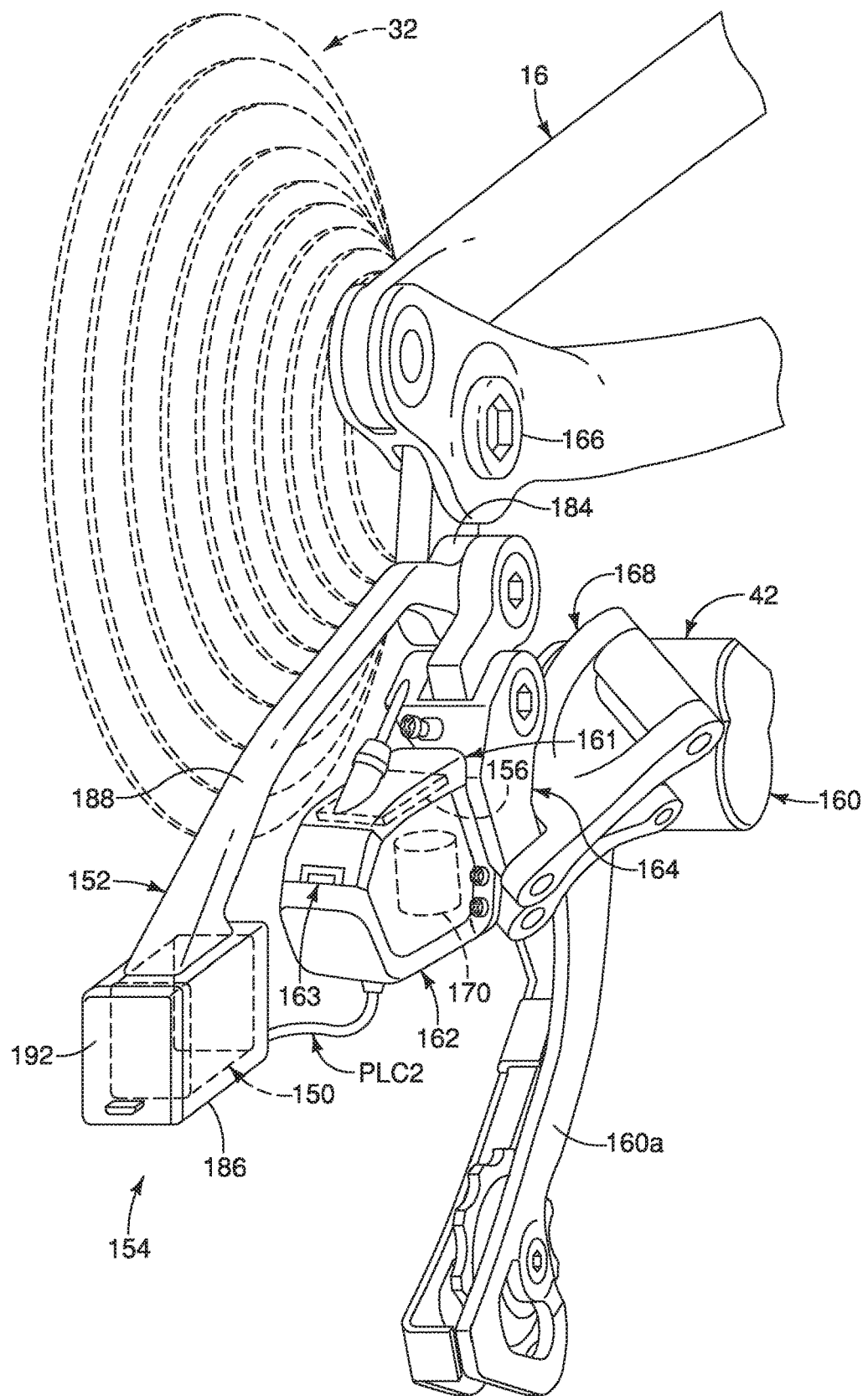
FIG. 9 is an enlarged, partial rear perspective view of the bicycle of FIG. 1 showing the bicycle electrical component assembly that includes the rear derailleur as the bicycle electrical component in accordance with the illustrated embodiment, with the rear derailleur having a power supply unit mounted to the rear derailleur via a power supply bracket and with the rear derailleur having a chain guide in an extended position.
Figure 10:
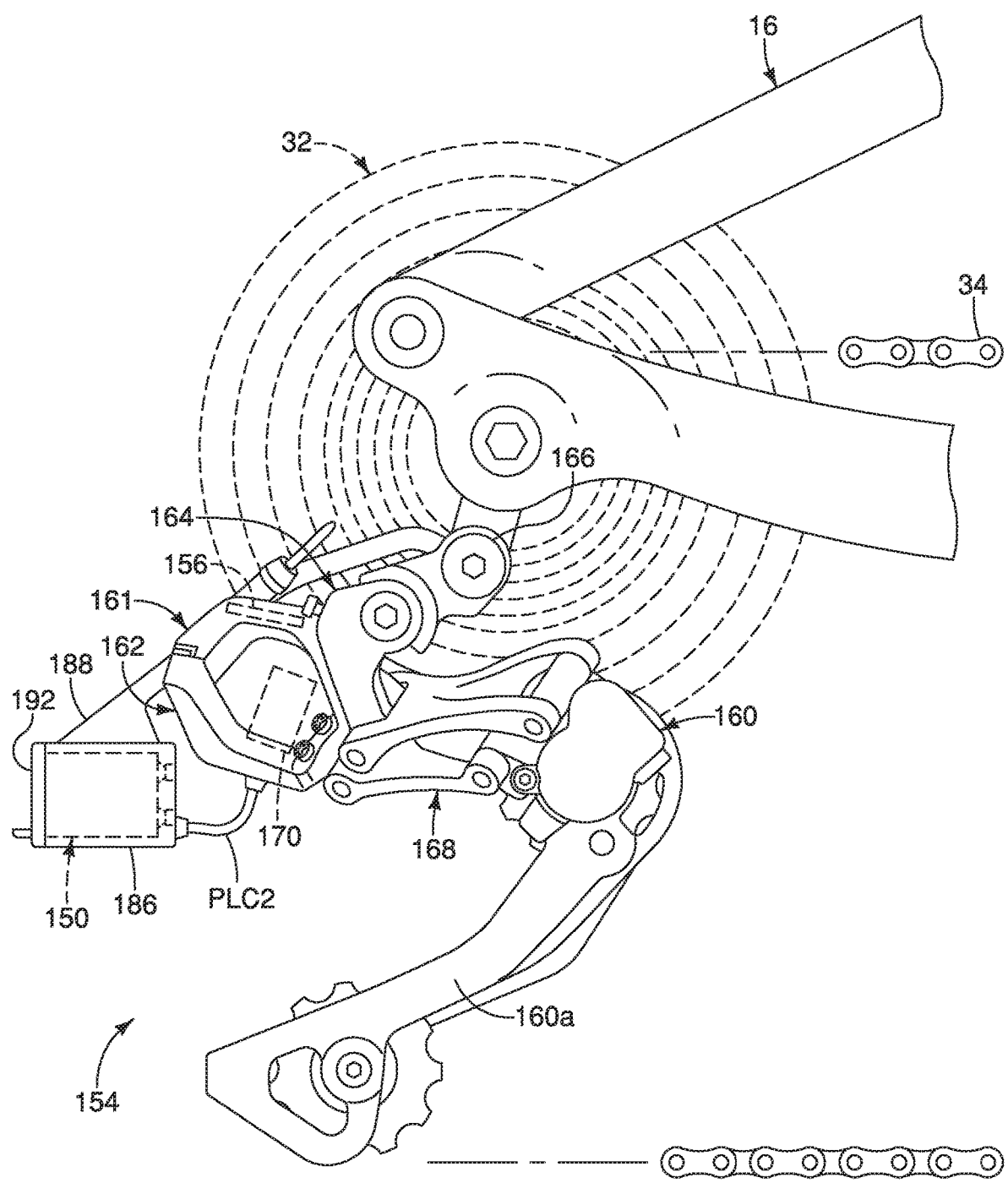
FIG. 10 is an enlarged, outside elevational view of the rear derailleur illustrated in FIGS. 1 and 9 having the power supply bracket supporting the power supply unit in a location that is primarily rearward and primarily below the base member of the rear derailleur while the rear derailleur is mounted to the bicycle frame.
Figure 11:
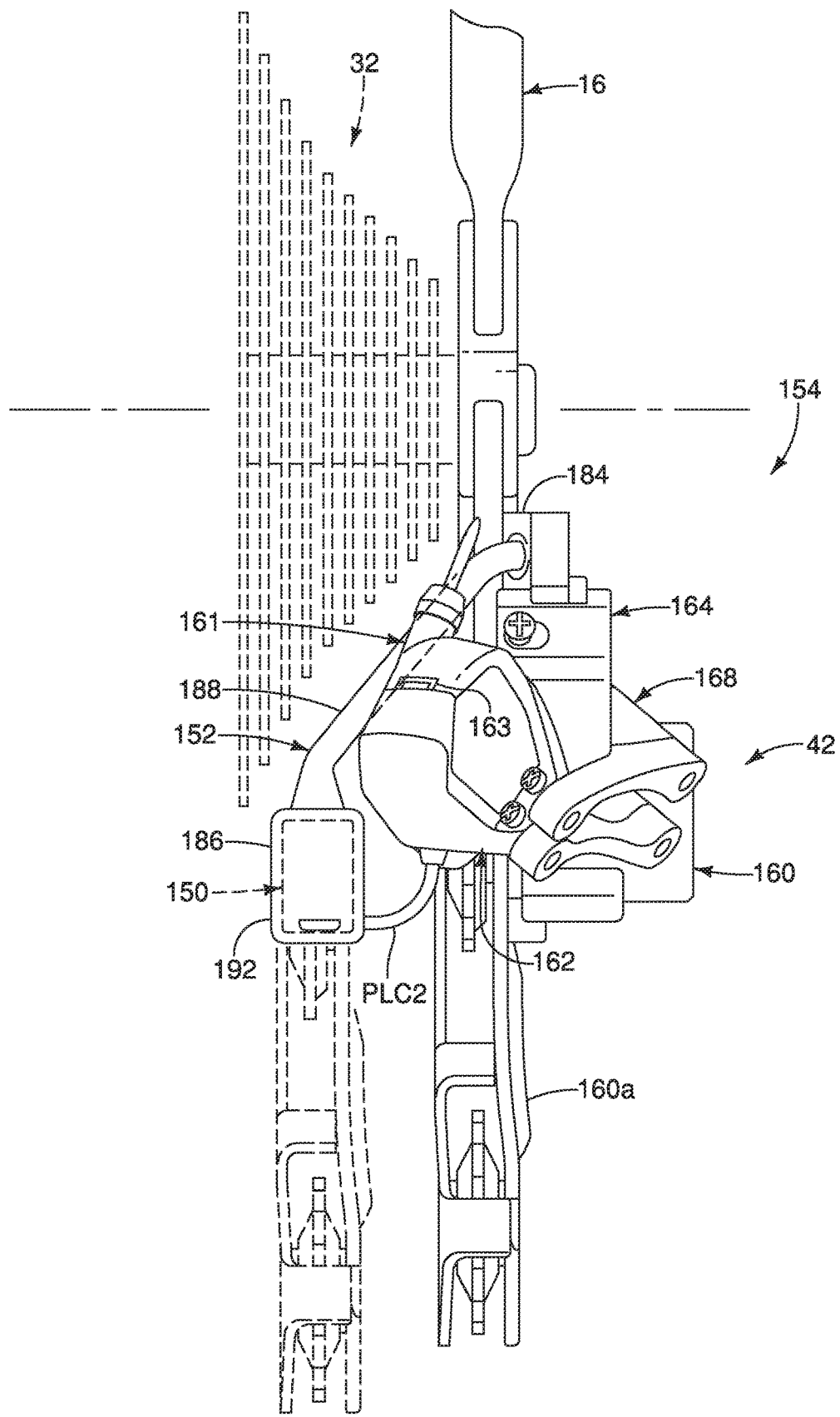
FIG. 11 is an enlarged, rear elevational view of the rear derailleur illustrated in FIGS. 1, 9 and 10 having the power supply bracket supporting the power supply unit in a location that is primarily rearward and primarily below the base member of the rear derailleur while the rear derailleur is mounted to the bicycle frame.

Turning now to FIGS. 9 to 11, the rear derailleur 42 will now be discussed in more detail. Here, the rear derailleur 42 is provided with a power supply unit 150 and a power supply bracket 152 to form a bicycle electrical component assembly 154. Thus, the bicycle electrical component assembly 154 comprises the bicycle electrical component (i.e., the rear derailleur 42), the power supply unit 150 and the power supply bracket 152. As explained below, the power supply unit 150 is detachably and reattachably supported to the power supply bracket 152. The bicycle electrical component (i.e., the rear derailleur 42) further comprises a wireless communicator 156 for receiving shift signals and transmitting position data and/or operational data.

Referring to FIG. 9, in the case of the rear derailleur 42, the wireless communicator 156 is disposed on the electrical actuation unit 162. In particular, the wireless communicator 156 is disposed inside a wireless communications unit 161. Preferably, the wireless communications unit 161 is snap-fitted to the electrical actuation unit 162 by a snap-fit structure 163 so that the wireless communicator 156 is detachably and reattachably attached to the electrical actuation unit 162. Alternatively, the wireless communicator 156 can be configured to be detachably or non-detachably contained within power supply bracket 152, power supply unit 150 or electrical actuation unit 162.

The bicycle electrical component (i.e., the rear derailleur 42) further comprises a movable member 160 and an electrical actuation unit 162. The bicycle electrical component (i.e., the rear derailleur 42) further comprises a base member 164 for supporting the electrical actuation unit 162. The electrical actuation unit 162 is electrically connected to the power supply unit 150 by an electrical cable PLC2 for receiving electrical power. The electrical actuation unit 162 also communicates with the wireless communicator 156 by utilizing power line communications through the electrical cable PLC2. In other words, signals or commands from the wireless communicator 156 can transmitted through the electrical cable PLC2 to the electrical actuation unit 162 and vice versa. The electrical cable PLC2 is identical to the electrical cable PLC1, as discussed above, and thus, the electrical cable PLC2 is pluggable into both the power supply unit 150 and the electrical actuation unit 162.

Since the bicycle electrical component is a rear derailleur in the bicycle electrical component assembly 154, the movable member 160 includes a chain guide 160a that is movably arranged with respect to the base member 164 to guide the bicycle chain 34. The chain guide 160a is pivotally mounted on a P-axle, and includes two pulleys that are rotatably mounted between a pair of guide plates. The bicycle electrical component (i.e., the rear derailleur 42) further comprises a fastener 166 that is configured to fix the base member 164 to the sub bicycle frame 16. Here, the fastener 166 is a fixing bolt. As seen in FIG. 11, the movable member 160 is operatively coupled to the electrical actuation unit 162 to move the chain guide 160a between a first (retracted) position and a second (extended) position by a linkage 168. Also, the chain guide 160a is pivotally supported on the base member 164 via the linkage 168.

As seen in FIG. 10, the electrical actuation unit 162 includes an electrical actuator 170 that is operatively coupled to the movable member 160 to actuate the movable member 160. Thus, the electrical actuator 170 is configured to actuate (i.e., move) the chain guide 160a of the movable member 160 to move the chain 34 between the rear sprockets. In the rear derailleur 42, the electrical actuator 170 is a reversible electric motor so that the chain guide 160a of the movable member 160 can be move back and forth in a lateral direction with respect to the sub bicycle frame 16.

Now, the power supply unit 150 and the power supply bracket 152 will be discussed in more detail. The power supply unit 150 can be any suitable electrical power source such as a rechargeable electrical battery, a disposable electrical battery, a fuel cell battery, etc. Thus, the power supply bracket 152 is configured to mount the power supply unit 150 to the bicycle electrical component (i.e., the rear derailleur 42). Here, the power supply bracket 152 is mounted to both the sub bicycle frame 16 and the rear derailleur 42 by the fastener 166. The power supply bracket 152 is also configured to be detachably and reattachably attached to an additional bicycle electrical component that is different from the bicycle electrical component. Specifically, the power supply bracket 152 is also configured to be detachably and reattachably attached to the rear shock 18 by one of the fastener that is used to secure one of the ends of the rear shock 18 to the sub bicycle frame 16. Thus, as seen in FIG. 1, a power supply bracket 152' is attached to the rear shock 18 by the same fastener that is used to secure the rear shock 18 to the bicycle frame 12. The power supply bracket 152' is identical to the power supply bracket 152. Thus, the power supply bracket 152' contains a power supply unit (not shown) that is identical to the power supply unit 150 for supplying electrical power to the rear shock 18. In addition, the power supply unit 150 is also configured to be detachably and reattachably attached to the power supply bracket 52 that is mounted to the front derailleur 40 that is one of a different bicycle electrical component from the rear derailleur 42.

Specifically, the power supply bracket 152 includes a mounting portion 184 that is configured to be mounted to the sub bicycle frame 16 by the fastener 166. The power supply bracket 152 further includes a battery receiving part 186 and the arm part 188. The arm part 188 extends between the battery receiving part 186 and the mounting portion 184. In the case of the illustrated embodiment of FIGS. 9 to 13, the power supply unit 150 is detachably and reattachably retained inside of the battery receiving part 186 of the power supply bracket 152 by a hinged door 192.

As seen in FIGS. 9 to 11, the power supply bracket 152 supports the power supply unit 150 in a location that is primarily rearward and primarily below the base member of the rear derailleur 42 while the war derailleur 42 is mounted to the sub bicycle frame 16. In particular, the power supply bracket 152 extends from a frame facing side of the base member 164, and supports the power supply unit 150 at a position with the power supply unit 150 disposed primarily rearward of the base member 164, while the rear derailleur 42 is mounted to the sub bicycle frame 16. The term "primarily rearward" as used herein means being disposed more than fifty percent rearward. In other words, the power supply unit 150 is disposed such that more than fifty percent of the power supply unit 150 is rearward of the base member 164. The power supply bracket 152 further supports the power supply unit 150 primarily below the base member 164 while the rear derailleur 42 is mounted to the sub bicycle frame 16. The term "primarily below" as used herein means being disposed more than fifty percent below. In other words, the power supply unit 150 is disposed such that more than fifty percent of the power supply unit 150 is below the base member 164.

While the wireless communications unit 161 is mounted on the electrical actuation unit 162, it will be apparent from this disclosure that the wireless communications unit 161 can be detachably and reattachably supported to at least one of a power supply unit, a power supply bracket and an electrical actuation unit. In any case, the wireless communications unit 161 is configured to be electrically connected to the at least one of the power supply unit, the power supply bracket and the electrical actuation unit.

Figure 12:
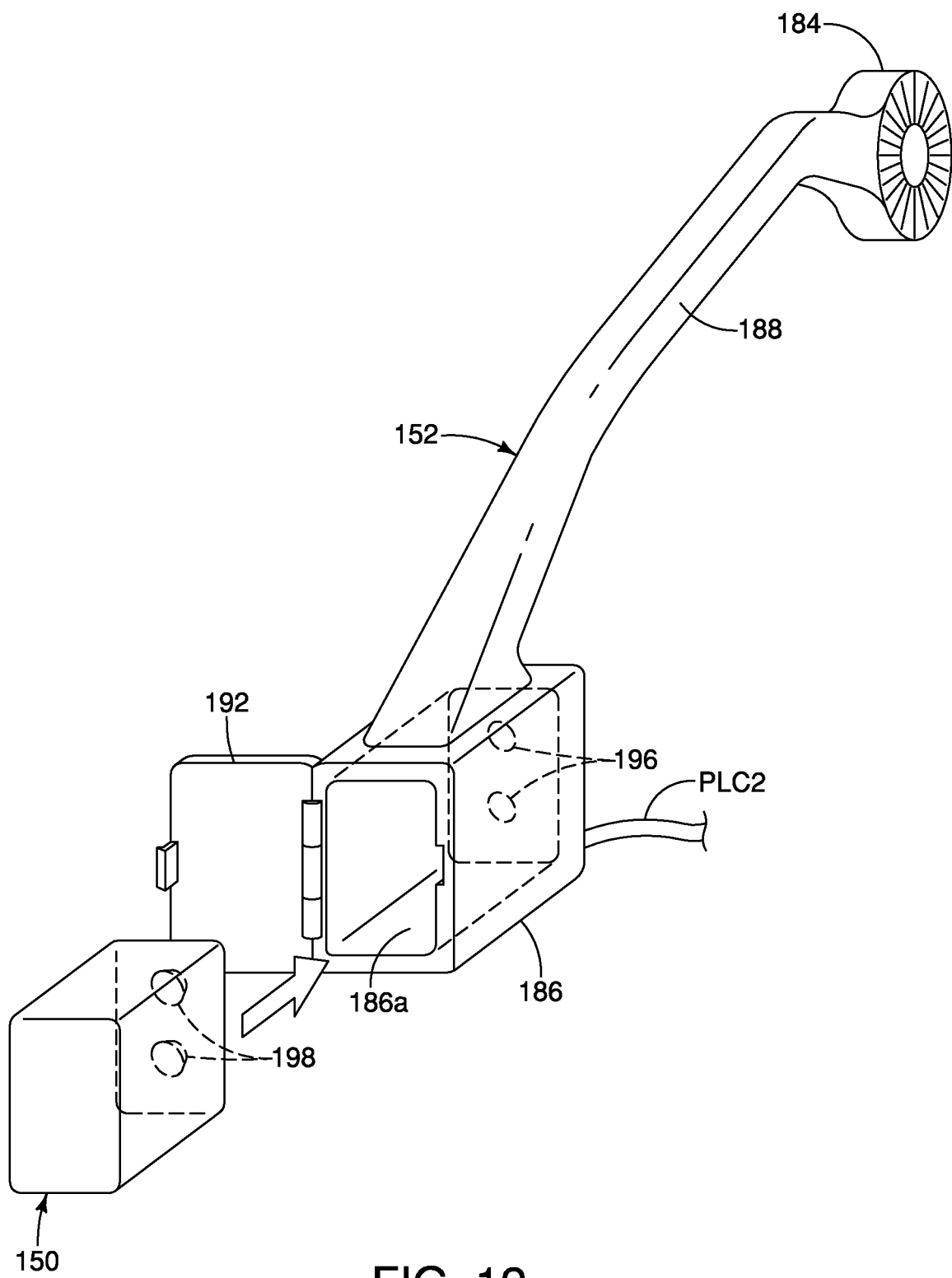
FIG. 12 is an enlarged, rear perspective view of the power supply bracket with the power supply unit exploded out from the power supply bracket.
Figure 13:
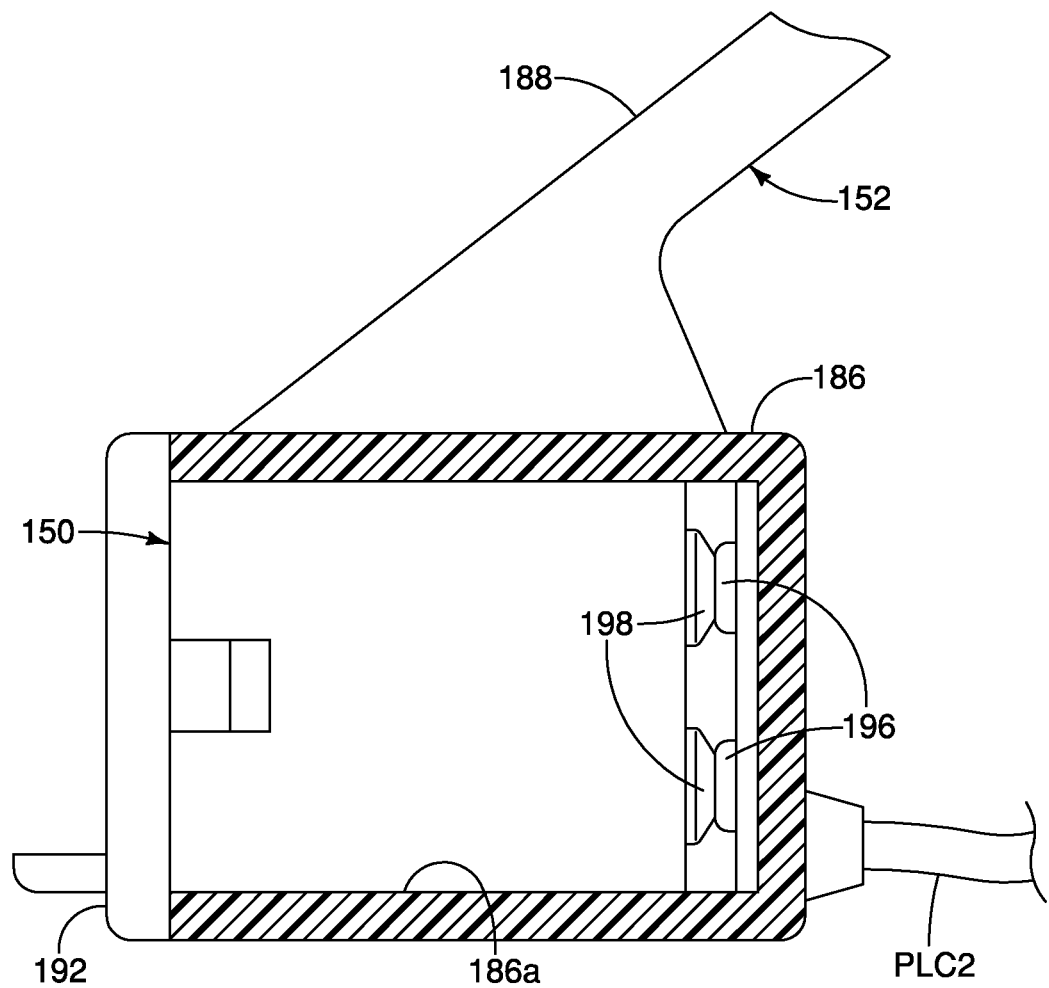
FIG. 13 is an enlarged, partial elevational view of the power supply bracket with a portion of the power supply bracket broken away to show the power supply unit inside the power supply bracket.

As seen in FIG. 12, the power supply bracket 152. The power supply unit 150 is removable and reinstallable inside the power supply bracket 152. The power supply unit 150 and the power supply bracket 152 have mating electrical interfaces for transmitting electrical power from the power supply unit 150 to the power supply bracket 152. In the illustrated electrical interfaces, the power supply bracket 152 is provided with a pair of stationary electrical contacts 196 and the power supply unit 150 is provided with a pair of spring loaded electrical contacts 198. However, the interfaces can be any suitable electrical interfaces that electrically transmit electrical power therebetween. For example, the interfaces can be contactless electrical connectors in which the metal electrical contacts of the mating electrical connectors do not create physically electrical connection for both contactless power and contactless data (contactless connectivity). Of course, other types of physically electrical connections using contacts and/or terminals can be used for the interfaces between the power supply unit 150 and the power supply bracket 152.

Figure 14:
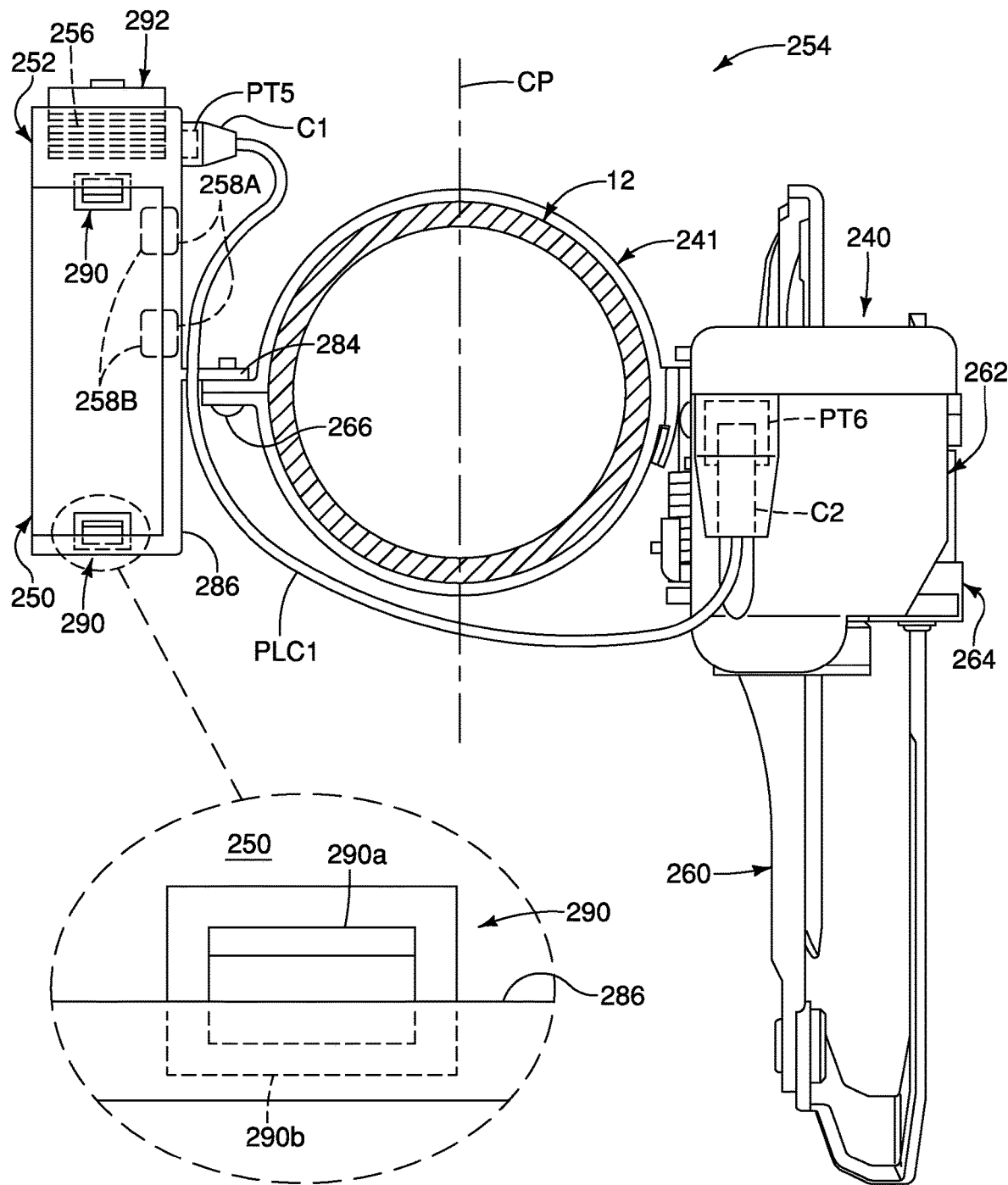
FIG. 14 is an enlarged, top view of a front derailleur (i.e., one of bicycle electrical components) in accordance with a second embodiment in which a power supply unit is mounted to the front derailleur via a power supply bracket so that the power supply unit and the front derailleur are disposed on opposite sides a vertical longitudinal center plane of the bicycle.

Turning now to FIG. 14, a front derailleur 240 will now be discussed in accordance with a second embodiment. The construction of the front derailleur 240 is identical to the construction of the front derailleur 40, as discussed above, except that the front derailleur 240 is mounted to the seat tube of the bicycle frame 12 using a clamp 241. Thus, the front derailleur 240 will only be briefly discussed herein.

Similar to the first embodiment, the front derailleur 240 is provided with a power supply unit 250 and a power supply bracket 252 to form a bicycle electrical component assembly 254. Here, the power supply unit 250 is mounted to the front derailleur 240 via the power supply bracket 252 so that the front derailleur 240 and the power supply unit 250 are disposed on opposite sides a vertical longitudinal center plane CP of the bicycle frame 12. The power supply unit 250 includes a built-in PLC unit that transmits and/or receives data. The bicycle electrical component (i.e., the front derailleur 40) further comprises a wireless communicator 256 that is supported on the power supply bracket 252. The wireless communicator 256 is configured to wirelessly receive shift signals and transmit position data and/or operational data from at least one of the rear derailleur 42, the cycle computer 44, the first electrical component operating device 46 and the second electrical component operating device 48.

Preferably, the power supply unit 250 forms an electrical connection with the power supply bracket 252 while the power supply unit 250 is installed in the power supply bracket 252. In particular, the power supply bracket 252 includes a first interface 258A, and the power supply unit 250 includes a second interface 258B that is configured to electrically connect with the first interface 258A in a state where the power supply unit 250 is supported to the power supply bracket 252. In this way, the power supply bracket 252 can be used for conducting power line communications. Here, the first interface 258A is formed by a pair of stationary electrical contacts, while the second interface 258B is formed by a pair of spring loaded electrical contacts. However, the first and second interfaces 258A and 258B can be any suitable electrical interfaces that electrically transmit electrical power therebetween. For example, the first and second interfaces 258A and 258B can be contactless electrical connectors in which the metal electrical contacts of the mating electrical connectors do not create physically electrical connection for both contactless power and contactless data (contactless connectivity). Of course, other types of physically electrical connections using contacts and/or terminals can be used for the first and second interfaces 258A and 258B.

The bicycle electrical component (i.e., the front derailleur 240) further comprises a movable member 260 and an electrical actuation unit 262. The bicycle electrical component (i.e., the front derailleur 240) further comprises a base member 264 for supporting the electrical actuation unit 262. Here, the electrical cable PLC1 of the first embodiment is used for connecting the electrical actuation unit 262 to the power supply unit 250. Specifically, the first connector C1 of the electrical cable PLC1 is plugged into an electrical port PT5 of the power supply bracket 252 and the second connector C2 of the electrical cable PLC1 is plugged into an electrical port PT6 of the electrical actuation unit 262. Thus, the electrical cable PLC1 interconnects the power supply unit 250 to the electrical actuation unit 262 via the power supply bracket 252.

The electrical actuation unit 262 also communicates with the wireless communicator 256 by utilizing power line communications through the electrical cable PLC1. In other words, signals or commands from the wireless communicator 256 can be transmitted through the electrical cable PLC1 to the electrical actuation unit 262 and vice versa.

Since the bicycle electrical component is a front derailleur in the bicycle electrical component assembly 254, the movable member 260 includes a chain guide 260a that is movably arranged with respect to the base member 264 to guide the bicycle chain 34. The bicycle electrical component (i.e., the front derailleur 240) further comprises a fastener 266 that is configured to fix the base member 264 to a bicycle frame 12. Here, the fastener 266 is a fixing bolt.

Also, the power supply unit 250 is detachably and reattachably supported to the power supply bracket 252 via a pair of snap-fit structures 290. Here, each of the snap-fit structures 290 includes a resilient latch 290a that is disposed on the power supply unit 250 and a recess 290b that is formed in the power supply bracket 252.

The power supply bracket 252 is disposed opposite side of the electrical actuation unit 262 with respect to the mounting portion of the base member 264 as viewed in a direction parallel to the vertical center plane CP of the bicycle frame 12 where the base member 264 is mounted to the bicycle frame 12. Thus, compared with the first embodiment, it can be easier to avoid interference of the power supply unit 250 with rider's leg during pedaling.

In this second embodiment, the wireless communicator 256 is disposed inside a wireless communications unit 292 that is releasably mounted to the power supply bracket 252. Preferably, the wireless communications unit 292 is snap-fitted to the electrical actuation unit 262 by a snap-fit structure, which is identical to the snap-fit structure 94, so that the wireless communicator 256 is detachably and reattachably attached to the electrical actuation unit 262.

Figure 15:
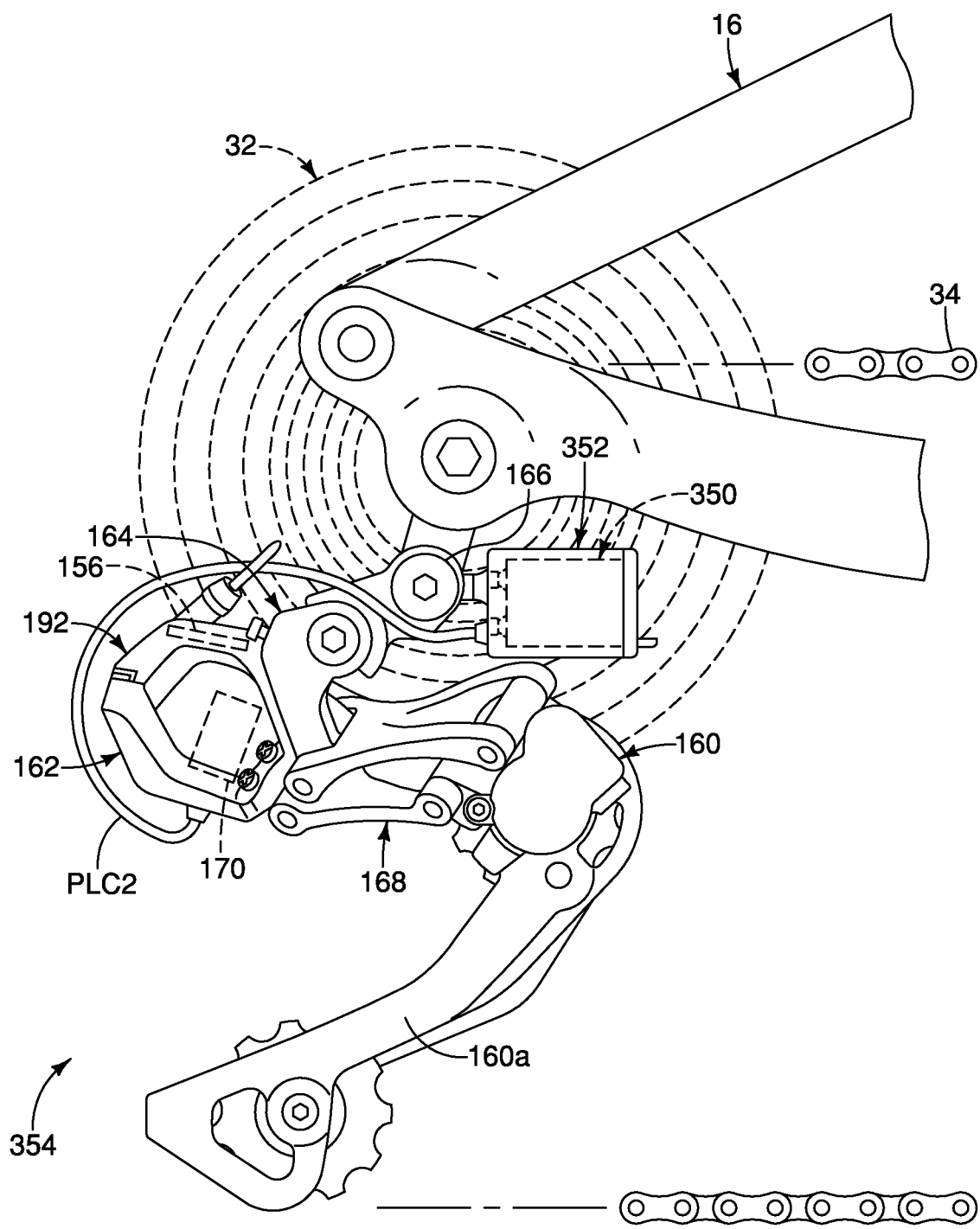
FIG. 15 is an enlarged, outside elevational view of the rear derailleur illustrated in FIGS. 1 and 9 having an alternative power supply bracket supporting an alternative power supply unit in a location that is primarily forward and primarily above the base member of the rear derailleur while the rear derailleur is mounted to the bicycle frame.
Figure 16:
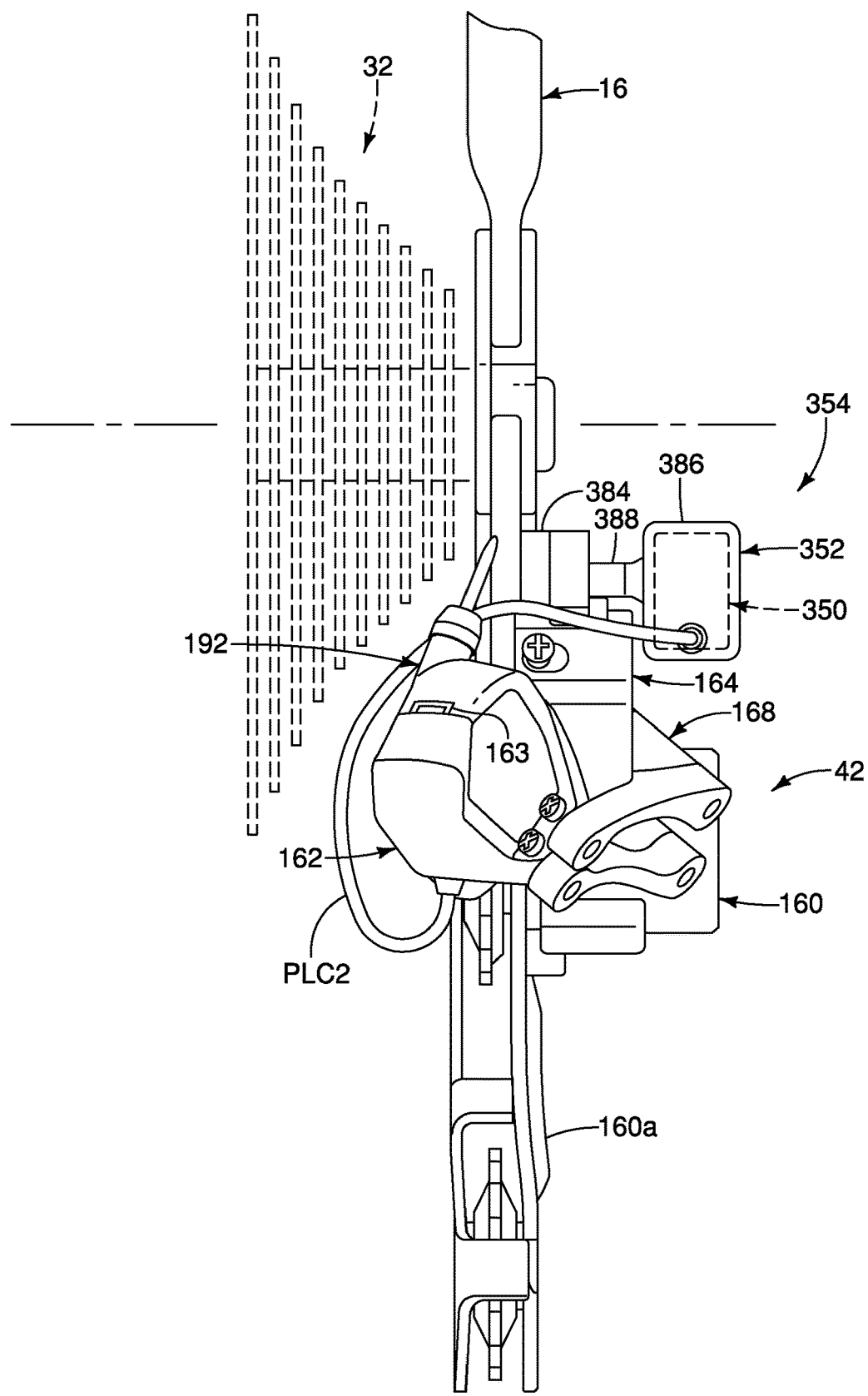
FIG. 16 is an enlarged, rear elevational view of the rear derailleur illustrated in FIG. 15 having the power supply bracket supporting the power supply unit in a location that is primarily forward and primarily above the base member of the rear derailleur while the rear derailleur is mounted to the bicycle frame.

Turning now to FIGS. 15 and 16, the rear derailleur 42 is provided with a power supply unit 350 and a power supply bracket 352 supporting the power supply unit 350 in a location that is primarily forward and primarily above the base member 164 of the rear derailleur while the rear derailleur 42 is mounted to the sub bicycle frame 16. The power supply unit 350 can be any suitable electrical power source such as a rechargeable electrical battery, a disposable electrical battery, a fuel cell battery, etc. Thus, the power supply bracket 352 is configured to mount the power supply unit 350 to the bicycle electrical component (i.e., the rear derailleur 42). Here, the power supply bracket 352 includes a mounting portion 384 that is configured to be mounted to the sub bicycle frame 16 by the fastener 366. The power supply bracket 352 further includes a battery receiving part 386 and the arm part 388. The arm part 388 extends between the battery receiving part 386 and the mounting portion 384. In the case of the illustrated embodiment of FIGS. 15 and 16, the power supply unit 350 is detachably and reattachably retained inside of the battery receiving part 386 of the power supply bracket 352 by a hinged door 390.

The power supply bracket 352 supports the power supply unit 350 in a location that is primarily forward and primarily above the base member 164 of the rear derailleur 42 while the rear derailleur 42 is mounted to the sub bicycle frame 16. In particular, the power supply bracket 352 extends from a frame facing side of the base member 164, and supports the power supply unit 350 at a position with the power supply unit 350 disposed primarily forward of the base member 164, while the rear derailleur 42 is mounted to the sub bicycle frame 16. The term "primarily forward" as used herein means being disposed more than fifty percent forward. In other words, the power supply unit 350 is disposed such that more than fifty percent of the power supply unit 350 is forward of the base member 164. The power supply bracket 352 further supports the power supply unit 350 primarily above the base member 164 while the rear derailleur 42 is mounted to the sub bicycle frame 16. The term "primarily above" as used herein means being disposed more than fifty percent above. In other words, the power supply unit 350 is disposed such that more than fifty percent of the power supply unit 350 is above the base member 164.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom" "side", "vertical", "horizontal", "perpendicular" and "transverse" as well as any other similar directional terms refer to those directions of a bicycle in an upright, riding position and equipped with the bicycle electrical component assembly. Accordingly, these directional terms, as utilized to describe the bicycle electrical component assembly should be interpreted relative to a bicycle in an upright riding position on a horizontal surface and that is equipped with the bicycle electrical component assembly. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. "The term "detachably attached" or "detachably attaching", as used herein, encompasses configurations in which an element directly attached to another element by directly affixing the element to the other element while the element is detachable from the other element without damage; and configurations in which the element is indirectly attached to the other element via intermediate member(s) while the element is detachable from the other element and the intermediate member(s) without damage. This concept also applies to words of similar meaning, for example, "detachably joined", "detachably connected", "detachably coupled", "detachably mounted", "detachably bonded", "detachably fixed" and their derivatives." Also term "reattachably attached" or "reattachably attaching", as used herein, encompasses configurations in which an element directly attached to another element by directly affixing the element to the other element while the element is reattachable to the other element without damage; and configurations in which the element is indirectly attached to the other element via intermediate member(s) while the element is reattachable to the other element and the intermediate member(s) without damage. This concept also applies to words of similar meaning, for example, "reattachably joined", "reattachably connected", "reattachably coupled", "reattachably mounted", "reattachably bonded", "reattachably fixed" and their derivatives." Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle electrical rear derailleur comprising:
    a wireless communication unit configured to wirelessly receive a control signal;
    an electrical cable;
    an electrical port configured to be detachably connected to the electrical cable, the wireless communication unit being configured to receive electrical power from a power supply unit via the electrical cable.

2. The bicycle electrical rear derailleur according to claim 1, wherein
    the electrical port is an electrical female electrical receptor.

3. The bicycle electrical rear derailleur according to claim wherein
    the wireless communication unit includes a first housing.

4. The bicycle electrical rear derailleur according to claim 1 wherein
    the wireless communication unit includes a wireless communicator that is configured to receive shift signals and to transmit at least one of position data and operational data.

5. The bicycle electrical rear derailleur according to claim 1, further comprising
    a structure configured to detachably attach the wireless communications unit.

6. The bicycle electrical rear derailleur according to claim 1, further comprising
    a movable member; and
    an electrical actuation unit configured to actuate the movable member.

7. The bicycle electrical rear derailleur according to claim wherein
    the electrical actuation unit is configured to receive electrical power from the power supply unit via the electrical cable.

8. The bicycle electrical rear derailleur according to claim 6, wherein
    the electrical actuation unit is configured to receive a control signal from the electrical cable or the wireless communication unit.

9. The bicycle electrical rear derailleur according to claim 6, wherein
    the electrical actuation unit includes the electrical port.

10. The bicycle electrical rear derailleur according to claim 6, further comprising
    a base member configured to support the electrical actuation unit with respect to the bicycle frame.

11. The bicycle electrical rear derailleur according to claim 10, wherein
    the movable member includes a chain guide and the base member that supports the chain guide with respect to the bicycle frame.

12. A bicycle electrical rear derailleur comprising:
    a base member;
    a movable member;
    a linkage;
    a chain guide;
    an electrical cable;
    a wireless communication unit configured to wirelessly receive a control signal, the wireless communication unit being configured to receive electrical power via the electrical cable, the wireless communication unit being disposed on the base member; and
    an electrical port configured to be detachably connected to the electrical cable.

13. The bicycle electrical rear derailleur according to claim 1 wherein
    the wireless communication unit is supported to a housing of the power supply unit, the power supply unit having the electrical port that is detachably connected to the electrical cable.

* * * * *